(12) United States Patent  (10) Patent No.: US 12,487,944 B2
Zhang et al.  (45) Date of Patent: Dec. 2, 2025

(54) DATA MANAGEMENT METHOD, APPARATUS, AND SYSTEM, AND STORAGE MEDIUM

(71) Applicant: Huawei Technologies Co., Ltd., Shenzhen (CN)

(72) Inventors: Binghua Zhang, Shenzhen (CN); Guohua Shen, Dongguan (CN); Gang Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/298,006

(22) Filed: Apr. 10, 2023

(65) Prior Publication Data

US 2023/0259462 A1   Aug. 17, 2023

Related U.S. Application Data

(63) Continuation of application No. PCT/CN2021/120523, filed on Sep. 26, 2021.

(30) Foreign Application Priority Data

Oct. 10, 2020  (CN) .......................... 202011079720.3

(51) Int. Cl.
*G06F 12/14*  (2006.01)
*H04L 9/14*  (2006.01)

(52) U.S. Cl.
CPC ............ *G06F 12/1408* (2013.01); *H04L 9/14* (2013.01); *G06F 2212/1052* (2013.01)

(58) Field of Classification Search
CPC ......... G06F 12/1408; G06F 2212/1052; G06F 21/10; G06F 21/60; G06F 21/602;
(Continued)

(56) References Cited

U.S. PATENT DOCUMENTS

2018/0183580 A1   6/2018  Scarlata et al.
2019/0052635 A1*  2/2019  Liu ......................... G06F 21/53
(Continued)

FOREIGN PATENT DOCUMENTS

CN  103139221 A  6/2013
WO  WO-2019201154 A1 * 10/2019 ............. G16Y 30/10

*Primary Examiner* — Mohammad W Reza
(74) *Attorney, Agent, or Firm* — Conley Rose, P.C.

(57) ABSTRACT

A data management method comprises a first processing node that obtains a secure storage key based on a first external keying material corresponding to the first processing node, encrypts data corresponding to an application program in the first processing node, and sends encrypted data to a second processing node. The second processing node obtains a secure storage key based on a second external keying material corresponding to the second processing node, and decrypts the encrypted data that corresponds to the application program and that is sent by the first processing node. The second external keying material is the same as the first external keying material, whereby the second processing node and the first processing node may obtain a same secure storage key, and the second processing node may successfully decrypt the encrypted data that corresponds to the application program and that is sent by the first processing node.

20 Claims, 15 Drawing Sheets

(58) Field of Classification Search
CPC ....... G06F 21/6218; G06F 21/53; H04L 9/14;
H04L 9/0894; H04L 63/04; H04L
2463/062; H04L 9/0877; H04L 63/0435;
H04L 63/06; H04L 63/062; H04L 9/0863;
H04L 63/0428; H04W 12/04; H04W
12/10
See application file for complete search history.

(56) References Cited

U.S. PATENT DOCUMENTS

2019/0327611 A1* 10/2019 Middelesch ........ H04W 12/033
2020/0008051 A1* 1/2020 Hill ....................... H04W 12/04

* cited by examiner

DATA MANAGEMENT METHOD, APPARATUS, AND SYSTEM, AND STORAGE MEDIUM

CROSS-REFERENCE TO RELATED APPLICATIONS

This application is a continuation application of International Patent Application No. PCT/CN2021/120523, filed on Sep. 26, 2021, which claims priority to Chinese Patent Application No. 202011079720.3, filed on Oct. 10, 2020. The disclosures of the aforementioned applications are hereby incorporated by reference in their entireties.

TECHNICAL FIELD

This application relates to the field of cloud computing technologies, and in particular, to a data management method, apparatus, and system, and a storage medium.

BACKGROUND

A cloud computing system is a service system implemented based on a cloud computing technology, and includes a plurality of processing nodes and a storage node. The processing node is configured to: process data corresponding to an application program deployed in the processing node, and store processed data in a storage volume that is in the storage node and that corresponds to the application program. After an application program is migrated from one processing node (which is also referred to as a source processing node) to another processing node (which is also referred to as a target processing node), a mounting node of a storage volume that is in a storage node and that corresponds to the application program may be switched from the source processing node to the target processing node, so that the target processing node can use data that corresponds to the application program and that is stored in the storage node by the source processing node.

To ensure data security, the processing node usually encrypts the data corresponding to the application program and then stores encrypted data in the storage node. In a typical example, the processing node derives a secure storage key based on a hardware unique key (HUK) of a processor of the processing node, encrypts, by using the secure storage key, data corresponding to an application program in the processing node, and stores, in a storage volume that is in a storage node and that corresponds to the application program, encrypted data corresponding to the application program. The HUK is configured when the processor or a device including the processor is delivered from a factory, and HUKs of different processors are different.

However, in a solution in which a processing node encrypts data by using a secure storage key derived based on an HUK, after an application program is migrated from a source processing node to a target processing node, because an HUK of a processor of the source processing node is different from an HUK of a processor of the target processing node, a secure storage key derived by the target processing node is different from a secure storage key derived by the source processing node. Consequently, the target processing node cannot recover, from a storage node, data that corresponds to the application program and that is stored in the storage node by the source processing node. Therefore, data management flexibility is poor.

SUMMARY

This application provides a data management method, apparatus, and system, and a storage medium, to help improve data management flexibility. The technical solutions of this application are as follows.

According to a first aspect, a data management method is provided, and applied to a first processing node in a data management system. The data management system further includes a second processing node, and the method includes obtaining a secure storage key based on a first external keying material corresponding to the first processing node; encrypting, by using the secure storage key, data corresponding to an application program in the first processing node; and sending encrypted data to the second processing node, where a second external keying material corresponding to the second processing node is the same as the first external keying material.

According to this technical solution provided in this application, because the first external keying material corresponding to the first processing node is the same as the second external keying material corresponding to the second processing node, the secure storage key obtained by the first processing node based on the first external keying material may be the same as a secure storage key obtained by the second processing node based on the second external keying material. The second processing node may successfully decrypt, by using the secure storage key obtained by the second processing node, the data encrypted by the first processing node by using the secure storage key obtained by the first processing node. This helps improve data management flexibility.

Optionally, the obtaining a secure storage key based on a first external keying material corresponding to the first processing node includes obtaining the secure storage key based on the first external keying material, and a first internal keying material corresponding to the first processing node or an application internal keying material corresponding to the application program, where a second internal keying material corresponding to the second processing node is the same as the first internal keying material.

According to this technical solution provided in this application, the first processing node obtains the secure storage key based on the first external keying material, and the first internal keying material or the application internal keying material. Therefore, the secure storage key is obtained by the first processing node based on at least two keying materials. This helps ensure security of the secure storage key.

Optionally, a trusted operating system is configured in the first processing node, the application program includes a trusted application, the first internal keying material is an internal keying material corresponding to the trusted operating system, and the application internal keying material is an internal keying material corresponding to the trusted application.

Optionally, an execution environment of an operating system of the first processing node includes a trusted execution environment (TEE), and both the trusted operating system and the trusted application are in the TEE.

Optionally, the obtaining the secure storage key based on the first external keying material, and a first internal keying material corresponding to the first processing node or an application internal keying material corresponding to the application program includes generating the secure storage key based on a target key derivation algorithm and based on the first external keying material, and the first internal keying material or the application internal keying material.

According to this technical solution provided in this application, the first processing node generates the secure storage key based on the target key derivation algorithm and based on the first external keying material, and the first internal keying material or the application internal keying material. This helps ensure security of the secure storage key.

Optionally, the obtaining a secure storage key based on a first external keying material corresponding to the first processing node includes obtaining the secure storage key based on the first external keying material, a first internal keying material corresponding to the first processing node, and an application internal keying material corresponding to the application program, where a second internal keying material corresponding to the second processing node is the same as the first internal keying material.

According to this technical solution provided in this application, the first processing node obtains the secure storage key based on the first external keying material, the first internal keying material, and the application internal keying material. Therefore, the secure storage key is obtained by the first processing node based on at least two keying materials. This helps ensure security of the secure storage key.

Optionally, the obtaining the secure storage key based on the first external keying material, a first internal keying material corresponding to the first processing node, and an application internal keying material corresponding to the application program includes generating the secure storage key based on a target key derivation algorithm and based on the first external keying material, the first internal keying material, and the application internal keying material.

According to this technical solution provided in this application, the first processing node generates the secure storage key based on the target key derivation algorithm and based on the first external keying material, the first internal keying material, and the application internal keying material. This helps ensure security of the secure storage key.

Optionally, the generating the secure storage key based on a target key derivation algorithm and based on the first external keying material, the first internal keying material, and the application internal keying material includes determining a first initial key based on the application internal keying material; determining a second initial key based on the first internal keying material and the first external keying material; and generating the secure storage key based on the target key derivation algorithm and based on the first initial key and the second initial key.

According to this technical solution provided in this application, the first processing node determines the first initial key based on the application internal keying material, and determines the second initial key based on the first internal keying material and the first external keying material, so that the first processing node can generate the secure storage key.

Optionally, before the obtaining a secure storage key based on a first external keying material corresponding to the first processing node, the method further includes receiving the first external keying material allocated by a key management node, where external keying materials allocated by the key management node to processing nodes in a same cluster are the same.

According to this technical solution provided in this application, the key management node allocates the first external keying material to the first processing node, so that the first processing node can obtain the first external keying material corresponding to the first processing node.

Optionally, the cluster meets at least one of the following conditions such as service scenarios of the processing nodes in the cluster are the same; a quantity of processing nodes in the cluster is less than a preset quantity; and the processing nodes in the cluster are located in a same network topology.

According to this technical solution provided in this application, the service scenarios of the processing nodes in the cluster are the same, so that application program migration can be performed between the processing nodes in the cluster. The quantity of processing nodes in the cluster is less than the preset quantity, so that a quantity of processing nodes that have a same external keying material is small, to ensure security of external keying materials corresponding to the processing nodes in the cluster. The processing nodes in the cluster are located in the same network topology, so that the processing nodes in the cluster can communicate with each other.

Optionally, the receiving the first external keying material allocated by a key management node includes receiving encrypted first external keying material sent by the key management node, where the encrypted first external keying material is obtained by the key management node through encryption by using a first security key and based on a first encryption algorithm, and the first processing node and the key management node each have the first security key and the first encryption algorithm.

According to this technical solution provided in this application, because the first external keying material sent by the key management node to the first processing node is obtained by the key management node through encryption by using the first security key and based on the first encryption algorithm, transmission security of the first external keying material can be ensured. In other words, security of the first external keying material in a process in which the key management node sends the first external keying material to the first processing node can be ensured.

Optionally, before the receiving the first external keying material allocated by a key management node, the method further includes sending a key application request to the key management node, where the key application request carries a node identifier of the first processing node, and a key management node is configured to determine, based on the node identifier of the first processing node, the first external keying material corresponding to the first processing node.

According to this technical solution provided in this application, the first processing node sends the key application request to the key management node, so that the key management node can send, to the first processing node, the first external keying material corresponding to the first processing node, and the first processing node can obtain the first external keying material corresponding to the first processing node.

Optionally, after the receiving the first external keying material allocated by a key management node, the method further includes decrypting the first external keying material by using the first security key and based on the first encryption algorithm; encrypting decrypted first external keying material by using a first material key; and storing encrypted first external keying material in a trusted storage unit in the first processing node, where an execution environment of an operating system of the first processing node includes a rich execution environment (REE), and the trusted storage unit is in the REE.

According to this technical solution provided in this application, the first processing node decrypts the first external keying material that corresponds to the first processing node and that is sent by the key management node, and then encrypts and stores the first external keying material, so that storage security of the first external keying material can be ensured.

Optionally, before the encrypting decrypted first external keying material by using a first material key, the method further includes obtaining the first material key based on a hardware identifier of the first processing node. In this way, the first processing node can encrypt, by using the first material key, the first external keying material corresponding to the first processing node, and store the first external keying material.

Optionally, the sending encrypted data to the second processing node includes sending the encrypted data to a storage node, where the storage node is configured to send the encrypted data to the second processing node.

According to a second aspect, a data management method is provided, and applied to a second processing node in a data management system. The data management system further includes a first processing node, and the method includes receiving encrypted data that corresponds to an application program and that is sent by the first processing node; obtaining a secure storage key based on a second external keying material corresponding to the second processing node, where the second external keying material is the same as a first external keying material corresponding to the first processing node; and decrypting, by using the secure storage key, the encrypted data corresponding to the application program.

According to this technical solution provided in this application, because the first external keying material corresponding to the first processing node is the same as the second external keying material corresponding to the second processing node, a secure storage key obtained by the first processing node based on the first external keying material may be the same as the secure storage key obtained by the second processing node based on the second external keying material. The second processing node may successfully decrypt, by using the secure storage key obtained by the second processing node, the data encrypted by the first processing node by using the secure storage key obtained by the first processing node. This helps improve data management flexibility.

Optionally, the obtaining a secure storage key based on a second external keying material corresponding to the second processing node includes obtaining the secure storage key based on the second external keying material, and a second internal keying material corresponding to the second processing node or an application internal keying material corresponding to the application program, where the second internal keying material is the same as a first internal keying material corresponding to the first processing node.

According to this technical solution provided in this application, the second processing node obtains the secure storage key based on the second external keying material, and the second internal keying material or the application internal keying material. Therefore, the secure storage key is obtained by the second processing node based on at least two keying materials. This helps ensure security of the secure storage key.

Optionally, a trusted operating system is configured in the second processing node, the application program includes a trusted application, the second internal keying material is an internal keying material corresponding to the trusted operating system, and the application internal keying material is an internal keying material corresponding to the trusted application.

Optionally, an execution environment of an operating system of the second processing node includes a TEE, and both the trusted operating system and the trusted application are in the TEE.

Optionally, the obtaining the secure storage key based on the second external keying material, and a second internal keying material corresponding to the second processing node or an application internal keying material corresponding to the application program includes generating the secure storage key based on a target key derivation algorithm and based on the second external keying material, and the second internal keying material or the application internal keying material.

According to this technical solution provided in this application, the second processing node generates the secure storage key based on the target key derivation algorithm and based on the second external keying material, and the second internal keying material or the application internal keying material. This helps ensure security of the secure storage key.

Optionally, the obtaining a secure storage key based on a second external keying material corresponding to the second processing node includes obtaining the secure storage key based on the second external keying material, a second internal keying material corresponding to the second processing node, and an application internal keying material corresponding to the application program, where the second internal keying material is the same as a first internal keying material corresponding to the first processing node.

According to this technical solution provided in this application, the second processing node obtains the secure storage key based on the second external keying material, the second internal keying material, and the application internal keying material. Therefore, the secure storage key is obtained by the second processing node based on at least two keying materials. This helps ensure security of the secure storage key.

Optionally, the obtaining the secure storage key based on the second external keying material, a second internal keying material corresponding to the second processing node, and an application internal keying material corresponding to the application program includes generating the secure storage key based on a target key derivation algorithm and based on the second external keying material, the second internal keying material, and the application internal keying material.

According to this technical solution provided in this application, the second processing node generates the secure storage key based on the target key derivation algorithm and based on the second external keying material, the second internal keying material, and the application internal keying material. This helps ensure security of the secure storage key.

Optionally, the generating the secure storage key based on a target key derivation algorithm and based on the second external keying material, the second internal keying material, and the application internal keying material includes determining a first initial key based on the application internal keying material; determining a second initial key based on the second internal keying material and the second external keying material; and generating the secure storage key based on the target key derivation algorithm and based on the first initial key and the second initial key.

According to this technical solution provided in this application, the second processing node determines the first initial key based on the application internal keying material, and determines the second initial key based on the second internal keying material and the second external keying material, so that the second processing node can generate the secure storage key.

Optionally, before the obtaining a secure storage key based on a second external keying material corresponding to the second processing node, the method further includes receiving the second external keying material allocated by a key management node, where external keying materials allocated by the key management node to processing nodes in a same cluster are the same.

According to this technical solution provided in this application, the key management node allocates the second external keying material to the second processing node, so that the second processing node can obtain the second external keying material corresponding to the second processing node.

Optionally, the cluster meets at least one of the following conditions service scenarios of the processing nodes in the cluster are the same; a quantity of processing nodes in the cluster is less than a preset quantity; and the processing nodes in the cluster are located in a same network topology.

According to this technical solution provided in this application, the service scenarios of the processing nodes in the cluster are the same, so that application program migration can be performed between the processing nodes in the cluster. The quantity of processing nodes in the cluster is less than the preset quantity, so that a quantity of processing nodes that have a same external keying material is small, to ensure security of external keying materials corresponding to the processing nodes in the cluster. The processing nodes in the cluster are located in the same network topology, so that the processing nodes in the cluster can communicate with each other.

Optionally, the receiving the second external keying material allocated by a key management node includes receiving the encrypted second external keying material sent by the key management node, where the encrypted second external keying material is obtained by the key management node through encryption by using a second security key and based on a second encryption algorithm, and the second processing node and the key management node each have the second security key and the second encryption algorithm.

According to this technical solution provided in this application, because the second external keying material sent by the key management node to the second processing node is obtained by the key management node through encryption by using the second security key and based on the second encryption algorithm, transmission security of the second external keying material can be ensured. In other words, security of the second external keying material in a process in which the key management node sends the second external keying material to the second processing node can be ensured.

Optionally, before the receiving the second external keying material allocated by a key management node, the method further includes sending a key application request to the key management node, where the key application request carries a node identifier of the second processing node, and a key management system is configured to determine, based on the node identifier of the second processing node, the second external keying material corresponding to the second processing node.

According to this technical solution provided in this application, the second processing node sends the key application request to the key management node, so that the key management node can send, to the second processing node, the second external keying material corresponding to the second processing node, and the second processing node can obtain the second external keying material corresponding to the second processing node.

Optionally, after the receiving the second external keying material allocated by a key management node, the method further includes decrypting the second external keying material by using the second security key and based on the second encryption algorithm; encrypting decrypted second external keying material by using a second material key; and storing encrypted second external keying material in a trusted storage unit in the second processing node, where an execution environment of an operating system of the second processing node includes an REE, and the trusted storage unit is in the REE.

According to this technical solution provided in this application, the second processing node decrypts the second external keying material that corresponds to the second processing node and that is sent by the key management node, and then encrypts and stores the second external keying material, so that storage security of the second external keying material can be ensured.

Optionally, before the encrypting decrypted second external keying material by using a second material key, the method further includes obtaining the second material key based on a hardware identifier of the second processing node. In this way, the second processing node can encrypt, by using the second material key, the second external keying material corresponding to the second processing node and store the second external keying material.

Optionally, the receiving encrypted data that corresponds to an application program and that is sent by the first processing node includes receiving the encrypted data sent by a storage node, where the storage node is configured to store the encrypted data that corresponds to the application program and that is sent by the first processing node.

According to a third aspect, a data management apparatus is provided. The data management apparatus includes each module configured to perform the method according to any one of the first aspect or the optional manners of the first aspect.

According to a fourth aspect, a data management apparatus is provided. The data management apparatus includes each module configured to perform the method according to any one of the second aspect or the optional manners of the second aspect.

According to a fifth aspect, a computer device is provided. The computer device includes a memory and a processor.

The memory is configured to store a computer program.

The processor is configured to execute the computer program stored in the memory, to implement the method according to any one of the first aspect or the optional manners of the first aspect, or implement the method according to any one of the second aspect or the optional manners of the second aspect.

According to a sixth aspect, a computer-readable storage medium is provided. The computer-readable storage medium stores a computer program, and when the computer program is executed by a processor, the method according to any one of the first aspect or the optional manners of the first aspect is implemented, or the method according to any one of the second aspect or the optional manners of the second aspect is implemented.

According to a seventh aspect, a computer program product including instructions is provided. When the computer program product is run on a computer, the computer is enabled to perform the method according to any one of the first aspect or the optional manners of the first aspect, or perform the method according to any one of the second aspect or the optional manners of the second aspect.

According to an eighth aspect, a chip is provided. The chip includes a programmable logic circuit and/or program instructions. When the chip is run, the chip is configured to implement the method according to any one of the first aspect or the optional manners of the first aspect, or implement the method according to any one of the second aspect or the optional manners of the second aspect.

According to a ninth aspect, a data management system is provided. The data management system includes a first processing node and a second processing node. The first processing node includes the data management apparatus according to the third aspect, and the second processing node includes the data management apparatus according to the fourth aspect. Alternatively, at least one of the first processing node and the second processing node is the computer device according to the fifth aspect.

Optionally, the data management system further includes a storage node. The first processing node is configured to send, to the second processing node via the storage node, data corresponding to an application program.

Optionally, the data management system further includes a management node. The management node is configured to perform cluster division on processing nodes in the data management system in response to a cluster division instruction.

The management node may perform cluster division on the processing nodes in the data management system to obtain at least one cluster. The cluster meets at least one of the following conditions such as service scenarios of the processing nodes in the cluster are the same; a quantity of processing nodes in the cluster is less than a preset quantity; and the processing nodes in the cluster are located in a same network topology.

The technical solutions provided in this application bring the following beneficial effects.

According to a data management method, apparatus, and system, and a storage medium provided in this application, a data management system includes a first processing node and a second processing node. After obtaining a secure storage key based on a first external keying material corresponding to the first processing node, the first processing node encrypts, by using the secure storage key, data corresponding to an application program in the first processing node, and sends, to the second processing node, encrypted data corresponding to the application program. The second processing node receives the encrypted data that corresponds to the application program and that is sent by the first processing node, obtains a secure storage key based on a second external keying material corresponding to the second processing node, and decrypts, by using the secure storage key, the encrypted data corresponding to the application program. The second external keying material is the same as the first external keying material. Therefore, the second processing node and the first processing node may obtain the same secure storage key, and the second processing node may successfully decrypt the encrypted data that corresponds to the application program and that is sent by the first processing node. This helps improve data management flexibility.

DESCRIPTION OF EMBODIMENTS

Figure 1:
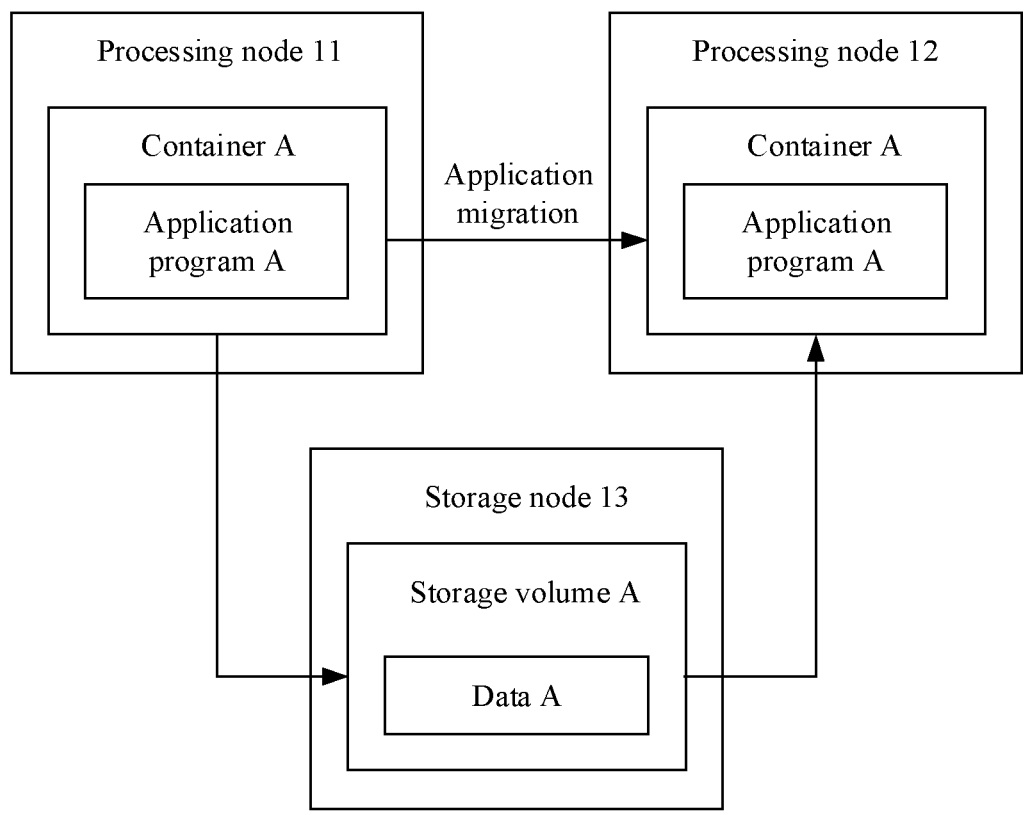
FIG. 1 is a schematic diagram of application program migration.

To make the principles, technical solutions, and advantages of this application clearer, the following further describes implementations of this application in detail with reference to the accompanying drawings.

A cloud computing technology is a technology that uses a network "cloud" to divide a huge data computing processing program into a plurality of small programs, analyzes and processes the small programs by using a system including a plurality of servers, and feeds back a processing result to a user. A cloud computing system (which is also referred to as a cloud computing platform) is a service system (which is also referred to as a service platform) implemented based on the cloud computing technology, and includes a plurality of processing nodes and a storage node. An application program is deployed in the processing node. The processing node is configured to process data corresponding to the application program deployed in the processing node, and store processed data in a storage volume that corresponds to the application program and that is in the storage node. An operating system of the processing node is configured to provide a running platform for the application program deployed in the processing node, so that the application program can run in the processing node. Optionally, both the processing node and the storage node may be servers.

With the rapid development of cloud computing technologies, a virtualization technology has features such as isolation, easy deployment, and independent hardware, which makes the virtualization technology increasingly become the basis for providing a cloud computing service externally. The application program may be deployed in the processing node based on the virtualization technology. In this way, different application programs in a same processing node are isolated from each other. Currently, mainstream virtualization technologies include two types such as a virtual machine technology and a container (container) technology. The two types of technologies may be used to virtualize resources including a central processing unit (CPU), a memory, input/output (I/O), a network, and the like. The container technology is a virtualization technology of a computer operating system. The technology enables a process to run in a relatively independent and isolated environment (including an independent file system, namespace, resource view, and the like), so that a procedure of deploying software (for example, the application program) can be simplified, portability and security of the software can be enhanced, and system resource utilization can be improved. The container technology is widely applied to a service-oriented scenario in the cloud computing field. The container technology provides a logical packaging mechanism. An application program packaged by using this mechanism may be decoupled from an actual execution environment (which is also referred to as a running environment) of the application program. Based on such decoupling, the application program can be easily and consistently deployed based on a container, regardless of whether the application program is in a private data center, a public cloud, or a personal computer. In other words, the application program may be deployed in the processing node in a unit of container, so that the application program can be decoupled from the actual execution environment of the application program.

To provide more stable services and reduce service overheads, the cloud computing technology not only requires resource management to have low management overheads and high scalability, but also requires the cloud computing system to provide functions such as load balancing. These crucial features are important means to ensure efficient and stable services of the cloud computing system. To ensure load balancing of the plurality of processing nodes in the cloud computing system, application program migration may be performed between the plurality of processing nodes in the cloud computing system. For example, the application program migration is performed between the plurality of processing nodes in the cloud computing system based on a live migration (live migration) technology. The live migration technology is also referred to as a hot migration technology, is one of core technologies for implementing resource management of the cloud computing system, and is also an important means for implementing load balancing of the cloud computing system. In the virtualization technology in which the application program is deployed based on the container, application program migration may be performed based on the container, that is, application program migration is performed between different processing nodes in the unit of container.

For example, FIG. 1 is a schematic diagram of application program migration. In FIG. 1, an example in which application program migration is performed based on a container is used for description. As shown in FIG. 1, a cloud computing system 10 includes a processing node 11, a processing node 12, and a storage node 13. The processing node 11, the processing node 12, and the storage node 13 may all be servers. An application program A deployed in the processing node 11 is located in a container A of the processing node 11, and the processing node 11 may store, in a storage volume A that corresponds to the application program A and that is in the storage node 13, data A corresponding to the application program A. The application program A may be migrated from the processing node 11 to the processing node 12 in a unit of container (where in other words, the container A in which the application program A is located is migrated from the processing node 11 to the processing node 12). After the application program A is migrated from the processing node 11 to the processing node 12, a mounting node of the storage volume A that corresponds to the application program A and that is in the storage node 13 may be switched from the processing node 11 to the processing node 12. In this way, the processing node 12 may use the data A that corresponds to the application program A and that is stored in the storage node 13 by the processing node 11. Optionally, after the application program A is migrated from the processing node 11 to the processing node 12, mapping between the storage volume A and the processing node 11 may be broken, and the storage volume A may be mapped to the processing node 12, so that the mounting node of the storage volume A that corresponds to the application program A and that is in the storage node 13 can be switched from the processing node 11 to the processing node 12. Both a migration process of the application program A and a switching process of the mounting node of the storage volume A corresponding to the application program A may be completed by a higher-layer management node by controlling interaction between the processing node 11, the processing node 12, and the storage node 13. The higher-layer management node may be a management node that is in the cloud computing system 10 and that is configured to manage the processing nodes and the storage node in the cloud computing system 10, or may be a node configured to manage the cloud computing system 10. This is not limited in this embodiment of this application.

An execution environment of the operating system of the processing node is usually an open REE, and there is a security problem. To ensure data security, the processing node usually encrypts the data corresponding to the application program and then stores encrypted data in the storage node. In a typical example, a processing node supports advanced RISC machines (ARM) TrustZone technology, and the processing node encrypts, based on the ARM TrustZone technology, data corresponding to an application program. The following describes the ARM TrustZone technology.

The ARM TrustZone technology, referred to as a TrustZone technology for short, is implemented by ARM and is a CPU underlying hardware isolation technology used to construct a TEE. The TrustZone technology can provide a device (for example, the processing node) with a system architecture whose execution environments include an REE and the TEE. In other words, there are two parallel execution environments in the system architecture based on the TrustZone technology, where the execution environments are respectively an open REE and a relatively closed TEE. The TEE is a main research field of the global platform (GP) international standards organization, and comprehensively uses technologies such as trusted computing and virtualization isolation to provide a TEE for a security-sensitive application and protect confidentiality and integrity of related data. The GP international standards organization is a cross-industry international standards organization, and is dedicated to developing, formulating, and releasing technical standards for security chips, to promote management and secure and interoperable service deployment of a multi-application industry environment. A working focus of the GP international standards organization is mainly on fields such as a secure element (SE), the TEE, and system messaging (such as mobile messaging).

The system architecture based on the TrustZone technology includes a secure world and a normal world. An execution environment corresponding to the secure world is a TEE, an execution environment corresponding to the normal world is an REE, and the normal world is also referred to as a non-secure world. The secure world and the normal world each have an independent system resource. The system resource includes but is not limited to at least one of a hardware resource and a software resource. The hardware resource includes but is not limited to a register, a physical memory, a peripheral, and the like. The system resource in the secure world may be referred to as a secure resource, and the system resource in the normal world may be referred to as a normal resource. Code and the resource in the secure world are protected by a strict access control policy. A process of the normal world is prohibited from accessing the secure world, to prevent unauthorized access to or theft of the resource stored in the secure world. This effectively reduces external attacks and virus intrusion.

Figure 2:
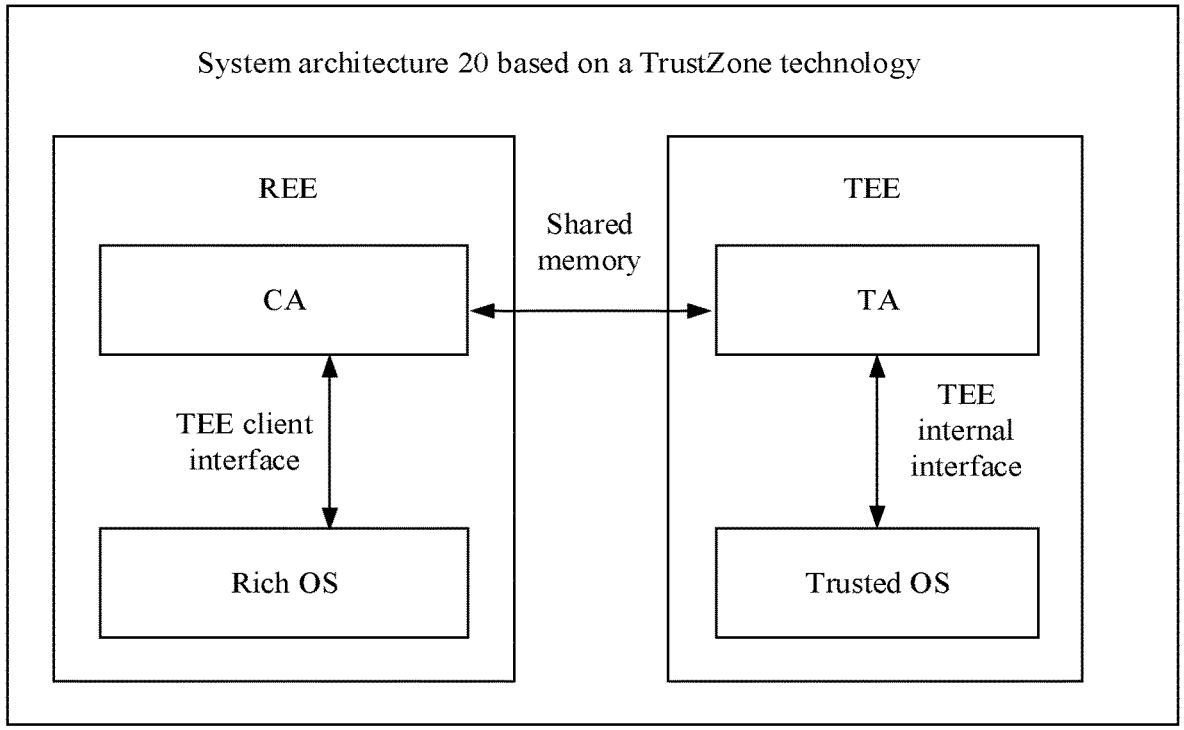
FIG. 2 is a schematic diagram of a system architecture based on a TrustZone technology.

Since 2011, the GP international standards organization started to formulate the TEE standards. Currently, most trusted OSs based on the TrustZone technology comply with the standards of the GP international standards organization. FIG. 2 shows a typical system architecture based on the TrustZone technology. In the system architecture 20 based on the TrustZone technology, an execution environment of an operating system includes an REE and a TEE. A rich operating system (OS) and a client application (CA) are deployed in the REE, and a trusted OS and a trusted application (TA) corresponding to the CA in the REE are deployed in the TEE. In addition, the trusted OS and the TA are usually encrypted and stored in a persistent storage medium in a form of data. The rich OS is configured to provide a running platform for the CA, and the trusted OS is configured to provide a running platform for the TA. A complete application program deployed in a device (for example, a processing node) includes a CA and a TA corresponding to the CA. The CA and the TA corresponding to the CA work together to implement a complete function of the application program. The CA is also referred to as a normal application, the TA is also referred to as a secure application, and the trusted OS is also referred to as a secure OS. The trusted OS and the TA are used to enable a security function of TrustZone. The CA is configured to interact with a client, and the CA separates, to the TA, core code, crucial service logic, and sensitive data that need to be isolated and protected, to greatly reduce security threats from the REE. For example, after receiving data sent by the client, the CA transmits crucial data in the data to the corresponding TA, and the TA processes the crucial data transmitted by the CA. As shown in FIG. 2, the CA communicates with the rich OS through a TEE client interface, and the TA communicates with the trusted OS through a TEE internal interface. The data is transmitted between the CA and the TA by using a shared memory. There is a communication interface between the rich OS and the trusted OS, and the CA may further communicate with the TA by invoking the communication interface between the rich OS and the trusted OS. The TEE client interface and the TEE internal interface may each be an application programming interface (API). For example, the TEE client interface is a TEE client API, and the TEE internal interface is a TEE internal API. Because the TA can communicate with the trusted OS through the TEE internal interface, some universal functions of the TA may be integrated into the trusted OS, and the trusted OS provides the universal functions to the TA in a form of a security service through the TEE internal interface, to simplify complexity of the TA.

Figure 3:
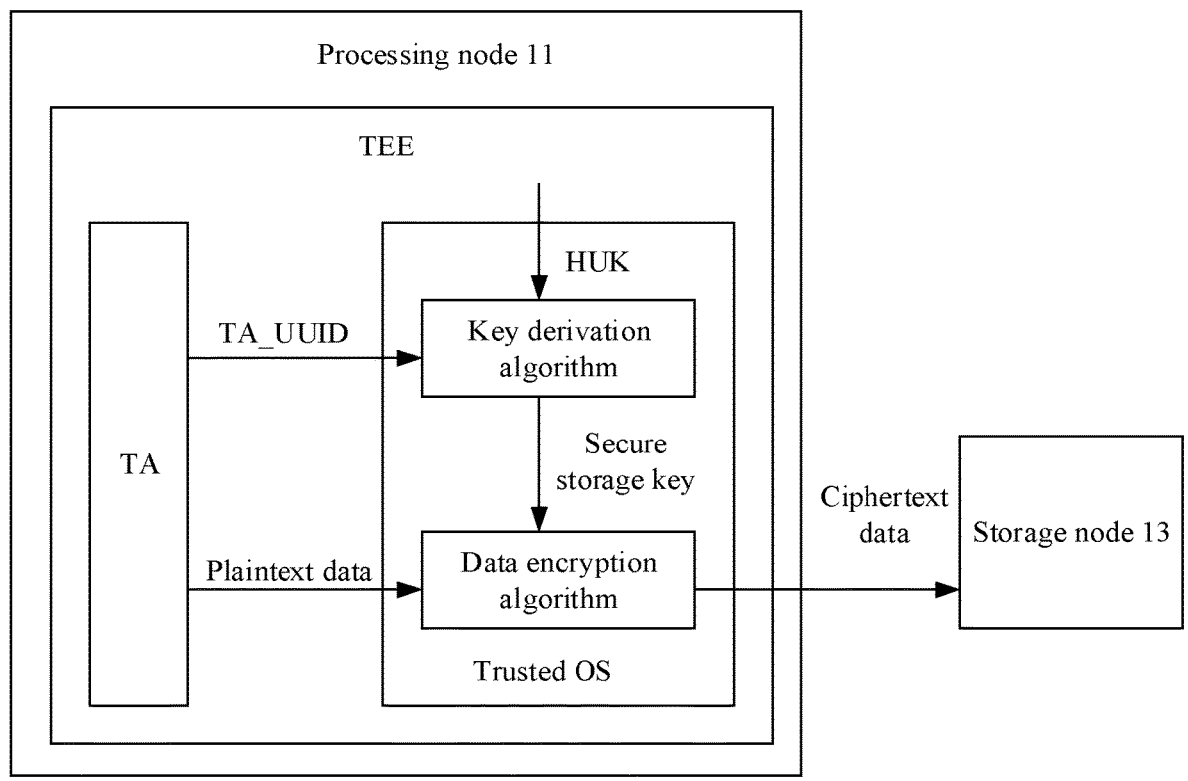
FIG. 3 is a schematic diagram of a secure storage solution.

The GP standard defines universal security services, such as encryption, decryption, and secure storage. In the system architecture based on the TrustZone technology, a mainstream secure storage solution is shown in FIG. 3. In FIG. 3, descriptions are provided by using an example in which the system architecture based on the TrustZone technology is a system architecture of a processing node 11, and the secure storage solution is applied to the processing node 11 and the storage node 13 shown in FIG. 1. As shown in FIG. 3, an execution environment of an OS of the processing node 11 includes a TEE (where certainly, the execution environment may further include an REE, which is not shown in FIG. 3). Both a trusted OS and a TA are in the TEE. The trusted OS derives a secure storage key based on a key derivation algorithm and based on an HUK (which is also referred to as a hardware trusted root) of a processor of a device (namely, the processing node 11) in which the trusted OS is located and a universally unique identifier (UUID) of the TA, encrypts, by using the secure storage key and based on a data encryption algorithm, plaintext data corresponding to the TA to obtain ciphertext data, and stores the ciphertext data in the storage node 13. The HUK is a key preconfigured when the processor or a device including the processor is delivered from a factory, and is usually used only by the trusted OS, to protect confidentiality. The UUID is a 128-bit identifier used to identify an amount of information in a computer system. The UUTD of the TA may be considered as an identifier of the TA, and the UUID of the TA may be denoted as TA_UUID.

Currently, the TrustZone technology is mainly applied to a terminal device (for example, a mobile phone). In a terminal device scenario, for data (which is also referred to as non-sensitive data) that does not relate to personal privacy, the terminal device usually uses a background cloud service to back up and recover the data. For data (which is also referred to as sensitive data, such as fingerprint data and password data) that involves personal privacy, the terminal device may use the secure storage solution shown in FIG. 3 to securely store the data based on the HUK of the processor. When the securely stored data cannot be recovered (for example, a hardware fault such as a processor damage occurs in the terminal device), a user may usually re-enter the data. In other words, the terminal device may not need to support backup and recovery of the sensitive data. In a server scenario, especially a cloud service scenario, the TrustZone technology needs to be used in a container scenario, and a server needs to support data backup and recovery (where for example, some functions cannot be used once some data cannot be recovered). However, in the server scenario, if data corresponding to an application program is stored based on the secure storage solution shown in FIG. 3, after the application program is migrated from one server (which is also referred to as a source server below) to another server (which is also referred to as a target server below), because HUKs of processors of the two servers are different, secure storage keys derived by the two servers are different. As a result, the target server cannot recover the data that corresponds to the application program and that is stored by the source server.

Figure 4:
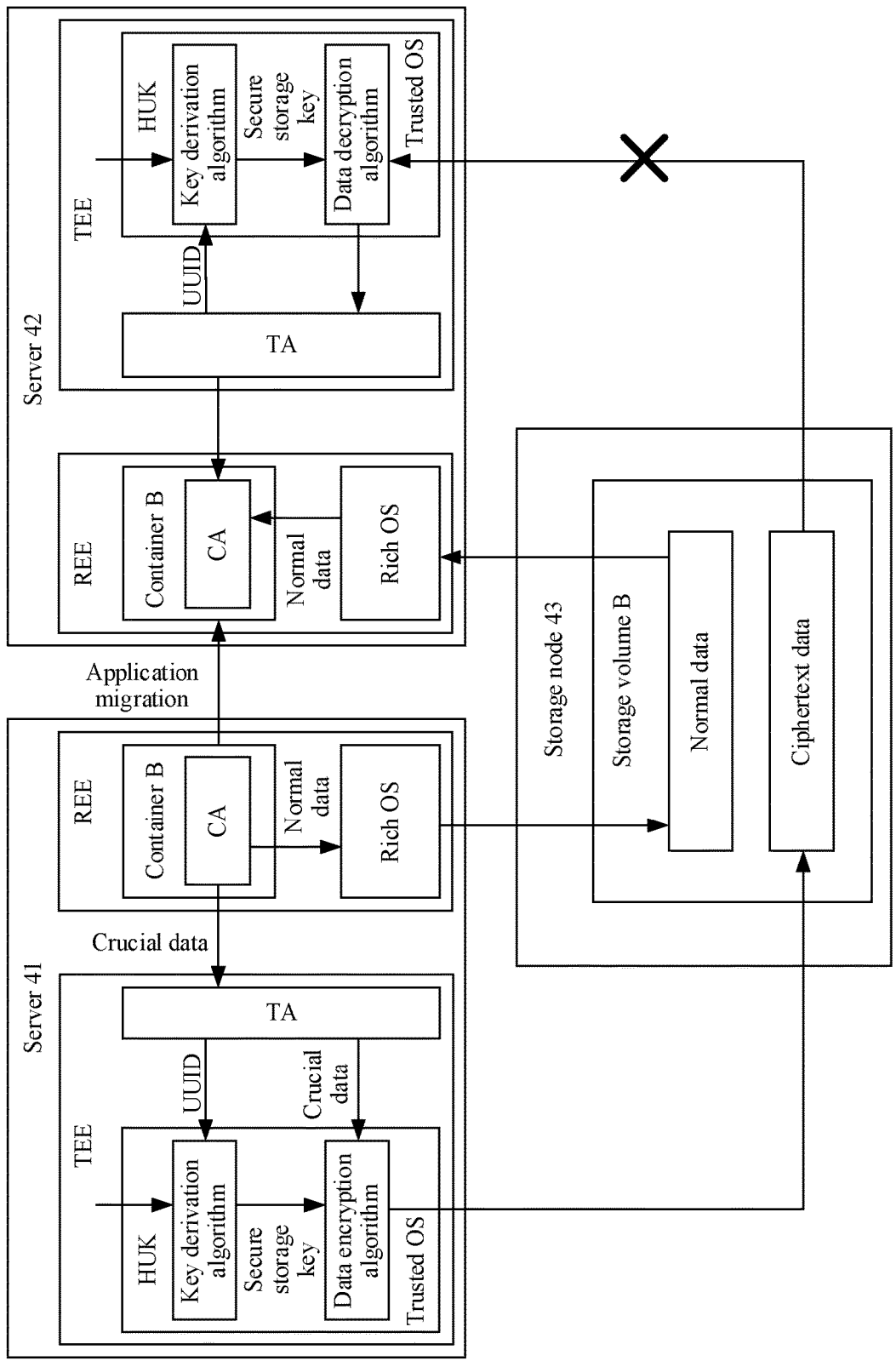
FIG. 4 is another schematic diagram of application program migration.

For example, FIG. 4 is another schematic diagram of application program migration. In FIG. 4, an example in which application program migration is performed based on a container in a server scenario is used for description. As shown in FIG. 4, a cloud computing system 40 includes a server 41, a server 42, and a storage node 43. An application program B (not shown in FIG. 4) deployed in the server 41 includes a CA and a TA. The CA is located in a container B of the server 41. The server 41 stores, in a storage volume B that corresponds to the application program B and that is in the storage node 43, data corresponding to the application program B. For example, that the server 41 stores, in a storage volume B that corresponds to the application program B and that is in the storage node 43, data corresponding to the application program B includes, after receiving the data that corresponds to the application program B and that is sent by a client, the CA of the application program B in the server 41 transmits, to a rich OS in the server 41, normal data (referring to non-sensitive data that does not need to be securely stored) in the data corresponding to the application program B, and transmits, to the TA of the application program B, crucial data (referring to securely stored sensitive data) in the data corresponding to the application program B; the rich OS in the server 41 stores, in the storage volume B that corresponds to the application program B and that is in the storage node 43, the normal data corresponding to the application program B; and the TA of the application program B transmits, to a trusted OS in the server 41, the crucial data corresponding to the application program B, and the trusted OS encrypts, by using a secure storage key derived based on an HUK of a processor of the server 41 and a UUID (for example, TA_UUID) of the TA, the crucial data corresponding to the application program B, to obtain ciphertext data, and stores the ciphertext data in the storage volume B that corresponds to the application program B and that is in the storage node 43. After the application program B is migrated from the server 41 to the server 42 (where both the CA and the TA are migrated to the server 42), a mounting node of the storage volume B that corresponds to the application program B and that is in the storage node 43 is switched from the server 41 to the server 42. Under triggering of the client, the server 42 obtains, from the storage node 43, the data corresponding to the application program B. For example, that the server 42 obtains, from the storage node 43, the data corresponding to the application program B includes a rich OS in the server 42 that obtains, from the storage node 43, the normal data corresponding to the application program B, and transmits, to the CA of the application program B in the server 42, the normal data corresponding to the application program B; and a trusted OS in the server 42 obtains, from the storage node 43, the ciphertext data corresponding to the application program B. However, because an HUK of a processor of the server 42 is different from the HUK of the processor of the server 41, a secure storage key derived by the trusted OS in the server 42 based on the HUK of the processor of the server 42 and the UUID (for example, TA_UUID) of the TA of the application program B is different from the secure storage key derived by the server 41. As a result, the trusted OS in the server 42 cannot decrypt the ciphertext data corresponding to the application program B, in other words, the server 42 cannot recover the ciphertext data stored in the server 41. It can be learned that the server 42 can only obtain, from the storage node 43, the normal data corresponding to the application program B, but cannot recover, from the storage node 43, the crucial data corresponding to the application program B. Therefore, a secure storage solution based on a TrustZone technology is difficult to be applicable to a scenario in which an application program is migrated across servers.

To implement sharing of ciphertext data between a source server and a target server in the scenario in which an application program is migrated across servers, a related technology provides two technical solutions such as a solution based on an enclave application and a solution of sharing a secure storage key. The following briefly describes the two technical solutions.

Solution 1: Solution Based on an Enclave Application

In this solution, the source server and the target server each have an enclave application. A secure communication channel may be established between the enclave application in the source server and the enclave application in the target server. After an application program is migrated from the source server to the target server, the enclave application in the source server obtains, from a storage node, ciphertext data corresponding to the application program, decrypts, by using a secure storage key (for example, sealing_key-AX) derived based on an HUK of a processor of the source server, the ciphertext data corresponding to the application program, to obtain plaintext data, and transmits, to the enclave application in the target server through the secure communication channel, the plaintext data corresponding to the application program, so that the target server can obtain the plaintext data. The enclave application in the target server may encrypt, by using a secure storage key (for example, sealing_key-BX) derived based on an HUK of a processor of the target server, the plaintext data that corresponds to the application program and that is sent by the source server, to obtain the ciphertext data, and store, in a storage volume that corresponds to the application program and that is in the storage node, the ciphertext data corresponding to the application program.

However, in this solution, the enclave application needs to decrypt, transmit, and encrypt the data at a service layer. This increases complexity of the enclave application and easily affects performance of the server.

Solution 2: Solution of Sharing a Secure Storage Key

In this solution, a key management system (or referred to as a key management node) shares a same secure storage key with the source server and the target server, an application program in the source server encrypts, by using the secure storage key, data corresponding to the application program, to obtain ciphertext data, and stores, in a storage node, the ciphertext data corresponding to the application program. After the application program is migrated from the source server to the target server, the application program in the target server obtains, from the storage node, the ciphertext data corresponding to the application program, and decrypts, by using a secure storage key that is the same as that of the source server, the ciphertext data corresponding to the application program, to obtain plaintext data corresponding to the application program.

However, a process of sharing the secure storage key easily leads to leakage of the secure storage key. For example, the secure storage key is maliciously intercepted in a process in which the key management system shares the secure storage key with the server. Security of this solution is poor. In addition, in this solution, data encryption and decryption need to be performed by the application program. This increases complexity of the application program.

In view of this, embodiments of this application provide a data management solution. In this technical solution, an application program can be migrated across servers based on a TrustZone technology, ciphertext data can be shared between a source server and a target server without increasing complexity of the application program, and performance of the server is not affected, thereby achieving high security. The following describes the technical solution provided in this application.

An implementation environment of this application is described first.

The technical solution provided in embodiments of this application may be applied to a data management system. The data management system may be a cloud computing system. The data management system includes at least two processing nodes. An application program may be deployed in the at least two processing nodes, application program migration may be performed between the at least two processing nodes, and data corresponding to the application program may be shared. The at least two processing nodes may each be a server or a terminal device. This is not limited in embodiments of this application.

Optionally, the data management system may further include a storage node (where there may be one or more storage nodes). The storage node may be communicatively connected to at least one processing node in the data management system. The storage node includes a storage volume corresponding to an application program in the processing node. The processing node may store data corresponding to the application program in the corresponding storage volume in the storage node, and the processing node may encrypt the data corresponding to the application program and then store encrypted data in the storage node, to ensure data security. The storage node may be a server or a terminal device. This is not limited in embodiments of this application.

Optionally, the data management system may further include a key management node. The key management node may be communicatively connected to the processing node in the data management system. The key management node is configured to allocate an external keying material to the processing node, so that the processing node can derive a secure storage key based on the external keying material allocated by the key management node, and encrypt, by using the derived secure storage key, the data corresponding to the application program. The key management node may be a server, a server cluster (which is also referred to as a key management system) including a plurality of servers, or a terminal device. This is not limited in embodiments of this application.

Figure 5:
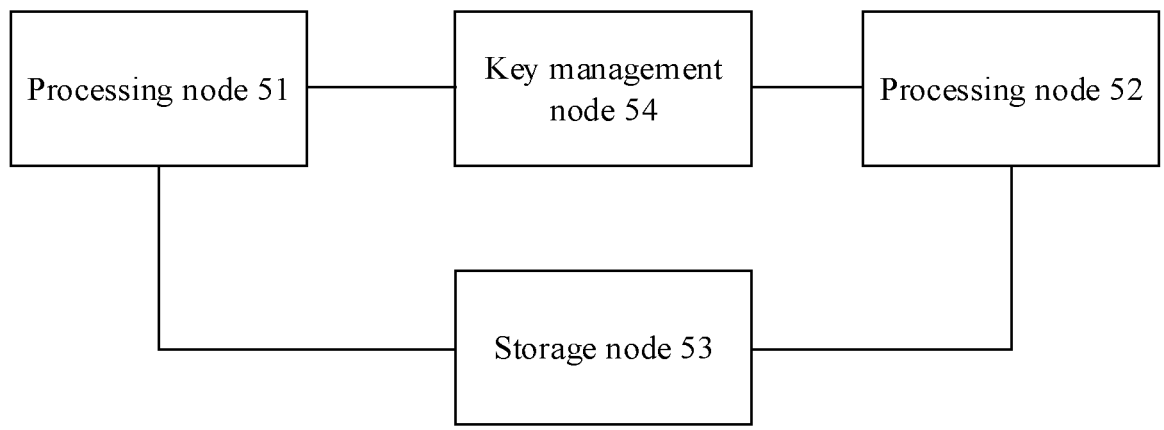
FIG. 5 is a schematic diagram of a data management system according to an embodiment of this application.

For example, FIG. 5 is a schematic diagram of a data management system 50 according to an embodiment of this application. The data management system 50 includes a processing node 51, a processing node 52, a storage node 53, and a key management node 54. The storage node 53 is communicatively connected to each of the processing node 51 and the processing node 52, and the key management node 54 is communicatively connected to each of the processing node 51 and the processing node 52. An application program is deployed in at least one of the processing node 51 and the processing node 52, and application program migration may be performed between the processing node 51 and the processing node 52. For example, an application program (for example, an application program C) in the processing node 51 may be migrated from the processing node 51 to the processing node 52.

The processing node 51 in which the application program C is located may store, in the storage node 53, data corresponding to the application program C. Optionally, the storage node 53 includes a storage volume corresponding to the application program C, and the processing node in which the application program C is located may store, in the storage volume that corresponds to the application program C and that is in the storage node 53, the data corresponding to the application program C. To ensure data storage security, the processing node in which the application program C is located may encrypt, by using a secure storage key, the data corresponding to the application program C, and store encrypted data in the storage volume that corresponds to the application program C and that is in the storage node 53.

The key management node 54 may allocate external keying materials to the processing node 51 and the processing node 52. The processing node 51 in which the application program C is located may obtain (for example, derive) a secure storage key based on the external keying material allocated by the key management node 54, and encrypt, by using the secure storage key, the data corresponding to the application program C. Optionally, the external keying materials allocated by the key management node 54 to the processing node 51 and the processing node 52 are the same. In this way, the processing node 51 and the processing node 52 may obtain a same secure storage key based on the same external keying material. If application program migration is performed between the processing node 51 and the processing node 52, the processing node 51 and the processing node 52 may recover data that corresponds to the application program and that is stored in the storage node 53 by the processing node 51 and the processing node 52, to implement data sharing. For example, after the application program C is migrated from the processing node 51 to the processing node 52, a mounting node of the storage volume C that corresponds to the application program C and that is in the storage node 53 may be switched from the processing node 51 to the processing node 52. The processing node 52 may obtain, from the storage volume C in the storage node 53, encrypted data (namely, ciphertext data) that corresponds to the application program C and that is stored in the storage node 53 by the processing node 51, and decrypt the encrypted data by using the secure storage key obtained based on the same external keying material.

It should be noted that, in this embodiment of this application, an application program may be deployed in a processing node based on a virtualization technology, and application program migration may be migration performed based on the virtualization technology. The virtualization technology may include a virtual machine technology and a container technology. For example, the application program C is deployed in the processing node 51 based on a container (or a virtual machine). The application program C may be migrated from the processing node 51 to the processing node 52 based on the container (or the virtual machine), in other words, a container (or a virtual machine) in which the application program C is located may be migrated from the processing node 51 to the processing node 52.

It should be further noted that the implementation environment shown in FIG. 5 is merely used as an example, and is not used to limit the technical solution of embodiments of this application. In an actual implementation process, the data management system may include more or fewer nodes (or devices) than those shown in FIG. 5. For example, a quantity of processing nodes and a quantity of storage nodes in the data management system may be configured based on a requirement. For another example, the data management system may further include a higher-layer management node, and the higher-layer management node manages the processing node and the storage node, and controls application program migration. For still another example, the key management node may alternatively not belong to the data management system, but may be a node or system independent of the data management system. This is not limited in embodiments of this application.

The foregoing describes the implementation environment of this application. The following describes a system architecture of the processing node in this application.

Figure 6:
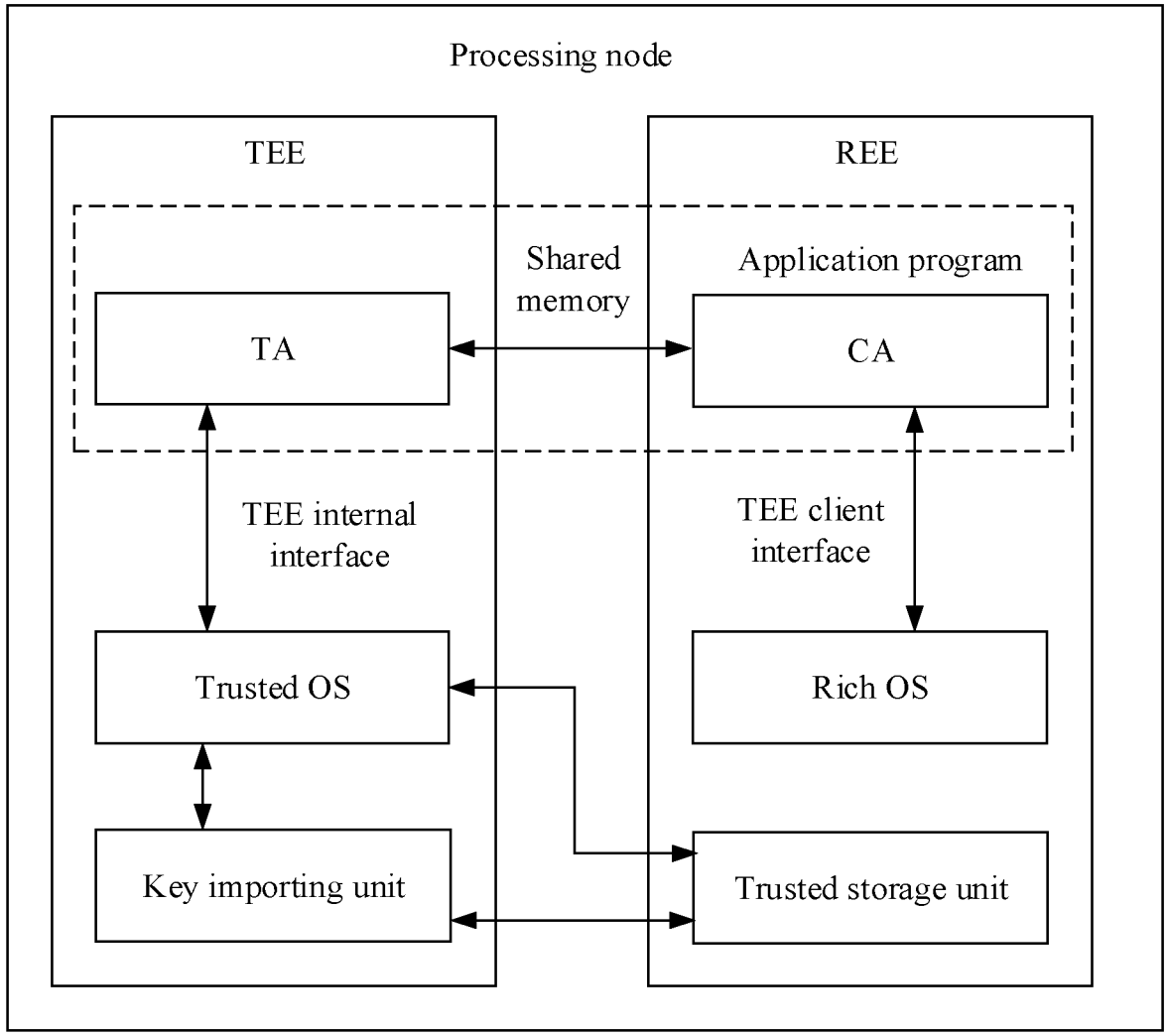
FIG. 6 is a schematic diagram of a structure of a processing node according to an embodiment of this application.

FIG. 6 is a schematic diagram of a structure of a processing node according to an embodiment of this application. The processing node may be the processing node 51 or the processing node 52 in the data management system 50 shown in FIG. 5, and the processing node may be a server or a terminal device. In this embodiment of this application, an example in which a system architecture of the processing node is a system architecture based on a TrustZone technology is used for description.

Refer to FIG. 6. An execution environment of an OS of the processing node includes an REE and a TEE. The OS of the processing node includes a rich OS and a trusted OS, and a complete application program deployed in the processing node includes a CA and a TA corresponding to the CA. Both the rich OS and the CA are in the REE, and both the trusted OS and the TA are in the TEE. In addition, the trusted OS and the TA are usually encrypted and stored in a persistent storage medium in a form of data. The rich OS communicates with the CA through a TEE client interface (TEE client API), and the trusted OS communicates with the TA through a TEE internal interface (TEE internal API). Data is transmitted between the CA and the TA by using a shared memory, and the CA may further communicate with the TA by invoking a communication interface between the rich OS and the trusted OS. The rich OS is configured to provide a running platform for the CA, and the trusted OS is configured to provide a running platform for the TA. The CA and the TA work together to implement a complete function of the application program.

Optionally, the processing node further includes a key importing unit and a trusted storage unit. The trusted storage unit is also referred to as a secure storage unit. The trusted storage unit is in the REE, and the trusted storage unit is communicatively connected to the trusted OS. The trusted storage unit is a storage unit for data encryption protection implemented by the trusted OS on an REE side. The key importing unit is in the TEE, and the key importing unit is communicatively connected to each of the trusted OS and the trusted storage unit. The key importing unit is configured to perform secure communication with a key management node (not shown in FIG. 6) outside the processing node, to obtain an external keying material allocated by the key management node to the processing node, invoke a secure storage interface of the trusted OS, derive a material key based on an HUK of a processor of the processing node, encrypt the external keying material by using the material key, and store an encrypted external keying material in the trusted storage unit, to ensure secure storage of the external keying material.

It should be noted that the structure of the processing node shown in FIG. 6 is merely used as an example, and is not used to limit the technical solution of embodiments of this application. In an actual implementation process, the processing node may further include other functional units, which are not listed one by one in this specification.

The foregoing describes the system architecture of the processing node in this application. The following describes a data management method provided in this application.

Figure 7:
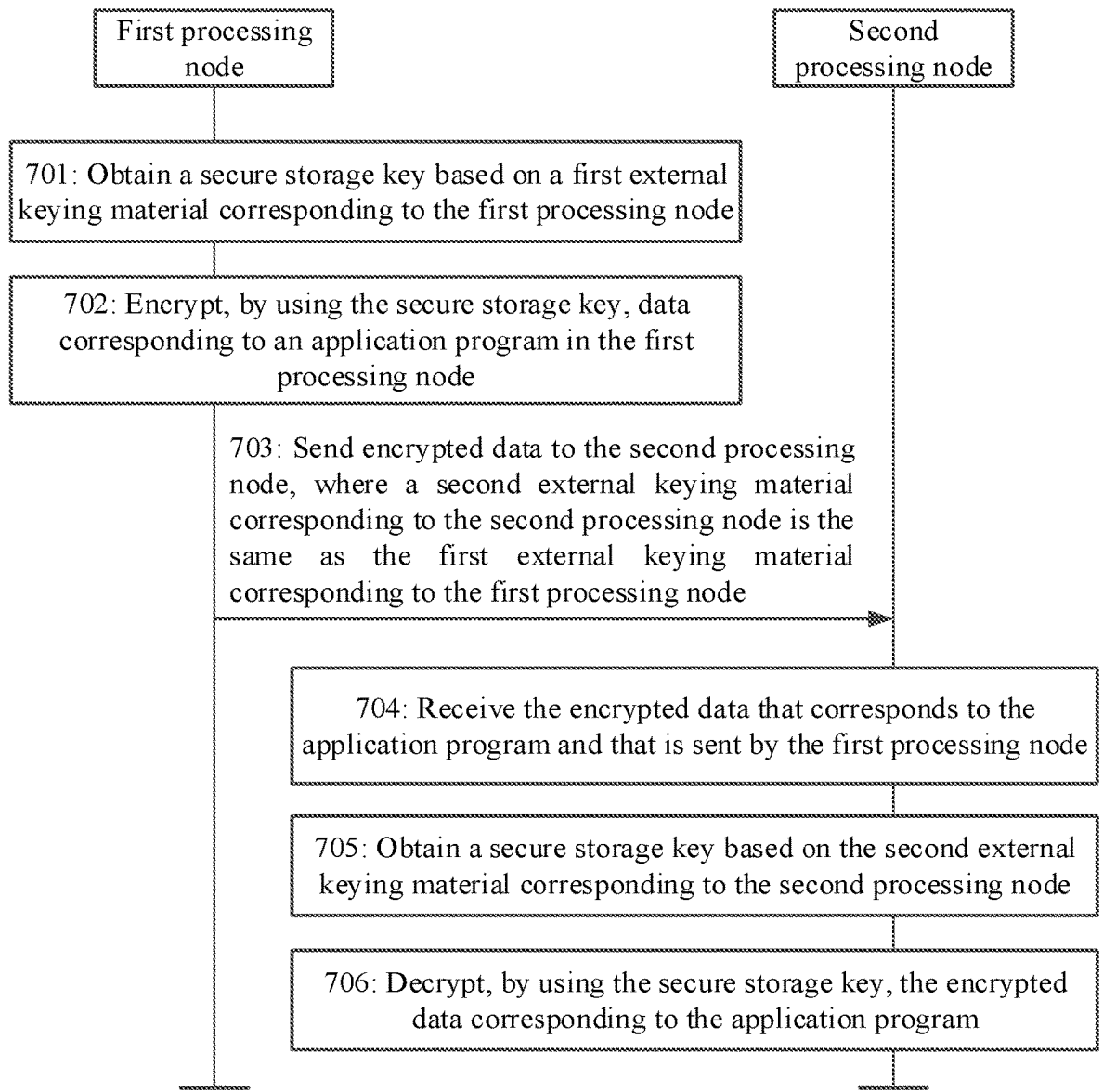
FIG. 7 is a flowchart of a data management method according to an embodiment of this application.

FIG. 7 is a flowchart of a data management method according to an embodiment of this application. The data management method may be applied to a data management system, and the data management system may include a first processing node (for example, the processing node 51 shown in FIG. 5) and a second processing node (for example, the processing node 52 shown in FIG. 5). A system architecture of any one of the first processing node and the second processing node may be shown in FIG. 6. Refer to FIG. 7. The data management method includes the following steps.

Step 701: The first processing node obtains a secure storage key based on a first external keying material corresponding to the first processing node.

Optionally, the first processing node generates the secure storage key based on a target key derivation algorithm and based on the first external keying material corresponding to the first processing node. For example, the target key derivation algorithm may be a password-based key derivation function 2 (PBKDF2) algorithm.

Optionally, the first processing node obtains the secure storage key based on the first external keying material corresponding to the first processing node, and a first internal keying material corresponding to the first processing node and/or an application internal keying material corresponding to an application program (for example, an application program C) in the first processing node. For example, the first processing node generates the secure storage key based on the target key derivation algorithm and based on the first external keying material, and the first internal keying material and/or the application internal keying material (for example, an internal keying material corresponding to the application program C). When generating the secure storage key, the first processing node uses the first external keying material, and further uses at least one of the first internal keying material and the application internal keying material (for example, the internal keying material corresponding to the application program C). For example, the first processing node generates the secure storage key based on the target key derivation algorithm and based on the first external keying material and the first internal keying material; the first processing node generates the secure storage key based on the target key derivation algorithm and based on the first external keying material and the application internal keying material (for example, the internal keying material corresponding to the application program C); or the first processing node generates the secure storage key based on the target key derivation algorithm and based on the first external keying material, the first internal keying material, and the application internal keying material (for example, the internal keying material corresponding to the application program C).

In an example, the first processing node generates the secure storage key based on the target key derivation algorithm and based on the first external keying material, the first internal keying material, and the application internal keying material (for example, the internal keying material corresponding to the application program C). The first processing node may determine a first initial key based on the application internal keying material (for example, the internal keying material corresponding to the application program C), determine a second initial key based on the first internal keying material and the first external keying material, and then generate the secure storage key based on the target key derivation algorithm and based on the first initial key and the second initial key.

Optionally, a trusted OS is configured in the first processing node, the application program (for example, the application program C) includes a TA, an execution environment of an OS of the first processing node includes a TEE, and both the trusted OS and the TA are in the TEE. The first internal keying material may be an internal keying material corresponding to the trusted OS in the first processing node, and the internal keying material corresponding to the trusted OS may be a keying material related to version information or the like of the trusted OS (where the internal keying material corresponding to the trusted OS is denoted as KM_OS). The application internal keying material may be an internal keying material corresponding to the TA included in the application program (for example, the application program C), and the internal keying material corresponding to the TA included in the application program (for example, the application program C) may include a keying material related to version information or the like of the TA (where the keying material related to the version information of the TA is denoted as KM_TA) and an identifier of the TA. The identifier of the TA may be a UUID (namely, TA_UUID) of the TA. The first processing node may perform an exclusive OR operation on KM_TA and TA_UUID to obtain the first initial key (denoted as SALT1), perform an exclusive OR operation on KM_OS and the first external keying material (denoted as KM_Cux) to obtain the second initial key (denoted as KM2), and derive the secure storage key (denoted as Cluster_TA_key-nx) based on the PBKDF2 algorithm and based on the first initial key (namely, SALT1) and the second initial key (namely, KM2).

It should be noted that the system architecture of the first processing node may be shown in FIG. 6. The first internal keying material (namely, KM_OS) may be stored in the trusted OS, and the application internal keying material (KM_TA and TA_UUID) may be stored in the TA of the application program (for example, the application program C). Because both the trusted OS and the TA are in the TEE, both the first internal keying material and the application internal keying material (for example, the internal keying material corresponding to the application program C) are stored in the TEE. This helps ensure security of the first internal keying material and the application internal keying material. Step 701 may be performed by the trusted OS in the first processing node, and the trusted OS may perform step 701 based on triggering of the TA of the application program (for example, the application program C). For example, the trusted OS performs step 701 when receiving an encrypted storage request sent by the TA of the application program (for example, the application program C). Optionally, a client may send, to the first processing node, data corresponding to the application program (for example, the application program C). The data corresponding to the application program (for example, the application program C) is received by a CA of the application program (for example, the application program C) in the first processing node. The CA of the application program (for example, the application program C) transmits, to the TA of the application program (for example, the application program C), the data corresponding to the application program (for example, the application program C). The TA of the application program (for example, the application program C) processes the data that corresponds to the application program (for example, the application program C) and that is transmitted by the CA, and sends, after completing the processing, the encrypted storage request to the trusted OS to trigger the trusted OS to perform step 701, where the encrypted storage request may carry the data corresponding to the application program (for example, the application program C). Optionally, the client sends, to the CA through a secure channel between the client and the CA of the application program (for example, the application program C), the data corresponding to the application program (for example, the application program C), and the CA transmits, to the TA through a secure channel (for example, a shared memory) between the CA and the corresponding TA, the data corresponding to the application program (for example, the application program C). Optionally, after receiving the data that corresponds to the application program (for example, the application program C) and that is sent by the client, the CA of the application program (for example, the application program C) transmits, to the corresponding TA, crucial data in the data corresponding to the application program (for example, the application program C). This is not limited in this embodiment of this application.

Step 702: The first processing node encrypts, by using the secure storage key, the data corresponding to the application program in the first processing node.

After obtaining the secure storage key, the first processing node may encrypt, by using the secure storage key, the data corresponding to the application program (for example, the application program C) in the first processing node, to obtain ciphertext data corresponding to the application program (for example, the application program C). In addition, after encrypting the data corresponding to the application program (for example, the application program C) in the first processing node, the first processing node may store encrypted data corresponding to the application program (for example, the application program C).

It should be noted that step 702 may be performed by the trusted OS in the first processing node. After receiving the encrypted storage request sent by the TA of the application program (for example, the application program C), the trusted OS encrypts, by using the secure storage key generated in step 701, the data that corresponds to the application program (for example, the application program C) and that is carried in the encrypted storage request.

Step 703: The first processing node sends the encrypted data to the second processing node, where a second external keying material corresponding to the second processing node is the same as the first external keying material corresponding to the first processing node.

After encrypting, by using the secure storage key, the data corresponding to the application program (for example, the application program C) in the first processing node, the first processing node may send, to the second processing node, the encrypted data corresponding to the application program (for example, the application program C). The second external keying material corresponding to the second processing node is the same as the first external keying material corresponding to the first processing node.

Optionally, the first processing node may directly send, to the second processing node, the encrypted data corresponding to the application program (for example, the application program C), or send, to the second processing node via a third-party node (referring to a node other than the first processing node and the second processing node), the encrypted data corresponding to the application program (for example, the application program C). This is not limited in this embodiment of this application. In this embodiment of this application, an example in which the first processing node sends, to the second processing node via the third-party node, the encrypted data corresponding to the application program (for example, the application program C) is used for description. Optionally, the data management system further includes a storage node. The first processing node may send, to the second processing node via the storage node, the encrypted data corresponding to the application program (for example, the application program C). For example, the first processing node sends, to the storage node, the encrypted data corresponding to the application program (for example, the application program C), and the storage node is configured to send, to the second processing node, the encrypted data corresponding to the application program (for example, the application program C).

For example, the first processing node sends, to the storage node, the encrypted data corresponding to the application program (for example, the application program C), the storage node stores the encrypted data corresponding to the application program (for example, the application program C), and the second processing node obtains, from the storage node, the encrypted data corresponding to the application program (for example, the application program C). Optionally, the storage node may have a storage volume corresponding to the application program (for example, the application program C), and the storage node may store, in the storage volume that corresponds to the application program (for example, the application program C) and that is in the storage node, the encrypted data corresponding to the application program (for example, the application program C).

It should be noted that step 703 may be performed by the trusted OS in the first processing node.

Step 704: The second processing node receives the encrypted data that corresponds to the application program and that is sent by the first processing node.

To ensure load balancing of the processing nodes in the data management system, application program migration may be performed between the processing nodes in the data management system. Optionally, after the application program (for example, the application program C) is migrated from the first processing node to the second processing node, the second processing node may receive the encrypted data that corresponds to the application program (for example, the application program C) and that is sent by the first processing node. It may be understood that in this embodiment of this application, descriptions are provided by using an example in which the second processing node receives, after the application program (for example, the application program C) is migrated, the encrypted data that corresponds to the application program (for example, the application program C) and that is sent by the first processing node. During actual application, the second processing node may receive, before the application program (for example, the application program C) is migrated from the first processing node to the second processing node, the encrypted data that corresponds to the application program (for example, the application program C) and that is sent by the first processing node, or may receive, in a process in which the application program (for example, the application program C) is migrated from the first processing node to the second processing node, the encrypted data that corresponds to the application program (for example, the application program C) and that is sent by the first processing node. This is not limited in this embodiment of this application.

Corresponding to step 703, the second processing node may receive the encrypted data that corresponds to the application program (for example, the application program C) and that is directly sent by the first processing node, or receive the encrypted data that corresponds to the application program (for example, the application program C) and that is sent by the first processing node via the third-party node. In this embodiment of this application, an example in which the second processing node receives the encrypted data that corresponds to the application program (for example, the application program C) and that is sent by the first processing node via the third-party node is used for description. The first processing node sends, to the storage node, the encrypted data corresponding to the application program (for example, the application program C), the storage node may send, to the second processing node, the encrypted data corresponding to the application program (for example, the application program C), and the second processing node may receive the encrypted data that corresponds to the application program (for example, the application program C) and that is sent by the storage node. Optionally, the second processing node may send, to the storage node under triggering of the client, a data obtaining request corresponding to the application program, to trigger the storage node to send, to the second processing node, the encrypted data corresponding to the application program (for example, the application program C). For example, when receiving a service request sent by the client, the second processing node sends, to the storage node, the data obtaining request corresponding to the application program.

It should be noted that, the system architecture of the second processing node may be shown in FIG. 6. Step 704 may be performed by a trusted OS in the second processing node, and the trusted OS may perform step 704 based on triggering of the TA of the application program (for example, the application program C, where the application program C is migrated from the first processing node to the second processing node) in the second processing node. For example, the trusted OS performs step 704 when receiving a service request sent by the TA of the application program (for example, the application program C). Optionally, the client may send, to the second processing node, the service request corresponding to the application program (for example, the application program C). The service request is received by the CA of the application program (for example, the application program C) in the second processing node. The CA of the application program (for example, the application program C) transmits the service request to the corresponding TA for processing. The TA sends the service request to the trusted OS to trigger the trusted OS to perform step 704.

In this embodiment of this application, application program migration is controlled by a higher-layer management node, and the higher-layer management node performs application program migration between different processing nodes based on load control of the processing nodes in the data management system. As described above, a complete application program includes a CA and a TA corresponding to the CA, and application program migration refers to migrating both the CA and the TA from one processing node to another processing node. The following briefly describes an application program migration process.

For example, a process of migrating the application program (for example, the application program C) from the first processing node to the second processing node includes the higher-layer management node sends an application migration indication to the first processing node, to indicate the first processing node to migrate the application program (for example, the application program C) from the first processing node to the second processing node; the first processing node migrates the CA of the application program (for example, the application program C) from the first processing node to the second processing node based on the indication of the higher-layer management node (for example, migrates a container in which the CA is located from the first processing node to the second processing node); the higher-layer management node switches a mounting node of the storage volume that corresponds to the application program (for example, the application program C) and that is in the storage node from the first processing node to the second processing node; and then, the second processing node triggers loading and running of the TA of the application program (for example, the application program C), to migrate the TA of the application program (for example, the application program C) to the second processing node. For example, the CA of the application program (for example, the application program C) in the second processing node initiates a TEE service request to an OS in the second processing node, and triggers the OS in the second processing node to load and run the TA of the application program (for example, the application program C), to migrate the TA of the application program (for example, the application program C) to the second processing node. In this way, the entire application program (for example, the application program C) is migrated from the first processing node to the second processing node.

Step 705: The second processing node obtains a secure storage key based on the second external keying material corresponding to the second processing node.

Optionally, the second processing node generates the secure storage key based on a target key derivation algorithm and based on the second external keying material corresponding to the second processing node. The second external keying material is the same as the first external keying material in step 701. Therefore, the second processing node may generate, based on the target key derivation algorithm and based on the second external keying material, the same secure storage key as that in step 701. The target key derivation algorithm may be a PBKDF2 algorithm.

Optionally, the second processing node obtains the secure storage key based on the second external keying material corresponding to the second processing node, and a second internal keying material corresponding to the second processing node and/or an application internal keying material corresponding to the application program (for example, the application program C) in the second processing node, where the second internal keying material is the same as the first internal keying material in step 701. For example, the second processing node generates the secure storage key based on the target key derivation algorithm and based on the second external keying material, and the second internal keying material and/or the application internal keying material (for example, an internal keying material corresponding to the application program C). When generating the secure storage key, the second processing node uses the second external keying material, and further uses at least one of the second internal keying material and the application internal keying material (for example, the internal keying material corresponding to the application program C). For example, the second processing node generates the secure storage key based on the target key derivation algorithm and based on the second external keying material and the second internal keying material; the second processing node generates the secure storage key based on the target key derivation algorithm and based on the second external keying material and the application internal keying material (for example, the internal keying material corresponding to the application program C); or the second processing node generates the secure storage key based on the target key derivation algorithm and based on the second external keying material, the second internal keying material, and the application internal keying material (for example, the internal keying material corresponding to the application program C). It should be noted that the material used by the second processing node to generate the secure storage key in step 705 is the same as the material used by the first processing node to generate the secure storage key in step 701, and the used target key derivation algorithms are the same. For example, if the first processing node generates the secure storage key based on the target key derivation algorithm and based on the first external keying material and the first internal keying material in step 701, the second processing node generates the secure storage key based on the target key derivation algorithm and based on the second external keying material and the second internal keying material in step 705; if the first processing node generates the secure storage key based on the target key derivation algorithm and based on the first external keying material and the application internal keying material (for example, the internal keying material corresponding to the application program C) in step 701, the second processing node generates the secure storage key based on the target key derivation algorithm and based on the second external keying material and the application internal keying material (for example, the internal keying material corresponding to the application program C) in step 705; or if the first processing node generates the secure storage key based on the target key derivation algorithm and based on the first external keying material, the first internal keying material, and the application internal keying material (for example, the internal keying material corresponding to the application program C) in step 701, the second processing node generates the secure storage key based on the target key derivation algorithm and based on the second external keying material, the second internal keying material, and the application internal keying material (for example, the internal keying material corresponding to the application program C) in step 705.

In an example, the second processing node generates the secure storage key based on the target key derivation algorithm and based on the second external keying material, the second internal keying material, and the application internal keying material (for example, the internal keying material corresponding to the application program C). The second processing node may determine a first initial key based on the application internal keying material (for example, the internal keying material corresponding to the application program C), determine a second initial key based on the second internal keying material and the second external keying material, and then generate the secure storage key based on the target key derivation algorithm and based on the first initial key and the second initial key.

Optionally, a trusted OS is configured in the second processing node, the application program (for example, the application program C) includes a TA, an execution environment of an OS of the second processing node includes a TEE, and both the trusted OS and the TA are in the TEE. The second internal keying material may be an internal keying material corresponding to the trusted OS in the second processing node, and the internal keying material corresponding to the trusted OS may be a keying material related to version information or the like of the trusted OS (where the internal keying material corresponding to the trusted OS is denoted as KM_OS). The application internal keying material may be an internal keying material corresponding to the TA included in the application program (for example, the application program C), and the internal keying material corresponding to the TA included in the application program (for example, the application program C) may include a keying material (namely, KM_TA) related to version information or the like of the TA and an identifier (for example, TA_UUID) of the TA. The second processing node may perform an exclusive OR operation on KM_TA and TA_UUID to obtain the first initial key (denoted as SALT1), perform an exclusive OR operation on KM_OS and the second external keying material (denoted as KM_Cux) to obtain the second initial key (denoted as KM2), and derive the secure storage key (denoted as Cluster_TA_key-nx) based on the PBKDF2 algorithm and based on the first initial key (namely, SALT1) and the second initial key (namely, KM2). Because the second external keying material is the same as the first external keying material in step 701, the second internal keying material is the same as the first internal keying material in step 701, TA_UUID is a UUID of a same TA, and KM_TA is a KM of a same TA, the secure storage key derived by the second processing node is the same as the secure storage key derived by the first processing node in step 701.

It should be noted that the system architecture of the second processing node may be shown in FIG. 6. The second internal keying material (namely, KM_OS) may be stored in the trusted OS, and the application internal keying material (for example, the internal keying material corresponding to the application program C, including KM_TA and TA_UUID) may be stored in the TA of the application program (for example, the application program C). Because both the trusted OS and the TA are in the TEE, both the second internal keying material and the application internal keying material (for example, the internal keying material corresponding to the application program C) are stored in the TEE. This helps ensure security of the second internal keying material and the application internal keying material. Step 705 may be performed by the trusted OS in the second processing node. For example, the trusted OS performs step 705 when obtaining the encrypted data corresponding to the application program (for example, the application program C). This is not limited in this embodiment of this application.

Step 706: The second processing node decrypts, by using the secure storage key, the encrypted data corresponding to the application program.

After obtaining the secure storage key, the second processing node may decrypt, by using the secure storage key, the encrypted data that corresponds to the application program (for example, the application program C) and that is obtained in step 704. Optionally, after decrypting the encrypted data corresponding to the application program (for example, the application program C), the second processing node may send, to the client, decrypted data corresponding to the application program (for example, the application program C), to respond to the service request of the client.

It should be noted that step 706 may be performed by the trusted OS in the second processing node. After decrypting the encrypted data corresponding to the application program (for example, the application program C), the trusted OS may transmit, to the TA of the application program (for example, the application program C), decrypted data corresponding to the application program (for example, the application program C). The TA of the application program (for example, the application program C) processes the decrypted data corresponding to the application program (for example, the application program C), and then transmits, to the CA of the application program (for example, the application program C), processed data corresponding to the application program (for example, the application program C). The CA of the application program (for example, the application program C) sends, to the client, the processed data corresponding to the application program (for example, the application program C), to respond to the service request of the client.

In conclusion, according to the data management method provided in this embodiment of this application, after obtaining a secure storage key based on a first external keying material corresponding to a first processing node, the first processing node encrypts, by using the secure storage key, data corresponding to an application program in the first processing node, and sends, to a second processing node, encrypted data corresponding to the application program. The second processing node receives the encrypted data that corresponds to the application program and that is sent by the first processing node, obtains a secure storage key based on a second external keying material corresponding to the second processing node, and decrypts, by using the secure storage key, the encrypted data corresponding to the application program. The second external keying material is the same as the first external keying material. Therefore, the second processing node and the first processing node may obtain a same secure storage key, and the second processing node may successfully decrypt the encrypted data that corresponds to the application program and that is sent by the first processing node. This helps improve data management flexibility.

In this embodiment of this application, an external keying material corresponding to a processing node is allocated by a key management node to the processing node. Before obtaining a secure storage key, the processing node may first obtain the external keying material allocated by the key management node to the processing node. In an optional implementation, before step 701, the method further includes the first processing node receives the first external keying material that corresponds to the first processing node and that is allocated by the key management node. Before step 705, the method further includes the second processing node receives the second external keying material that corresponds to the second processing node and that is allocated by the key management node. The following describes the data management method provided in embodiments of this application with reference to this application by using a process in which the processing node obtains the external keying material.

Figure 8:
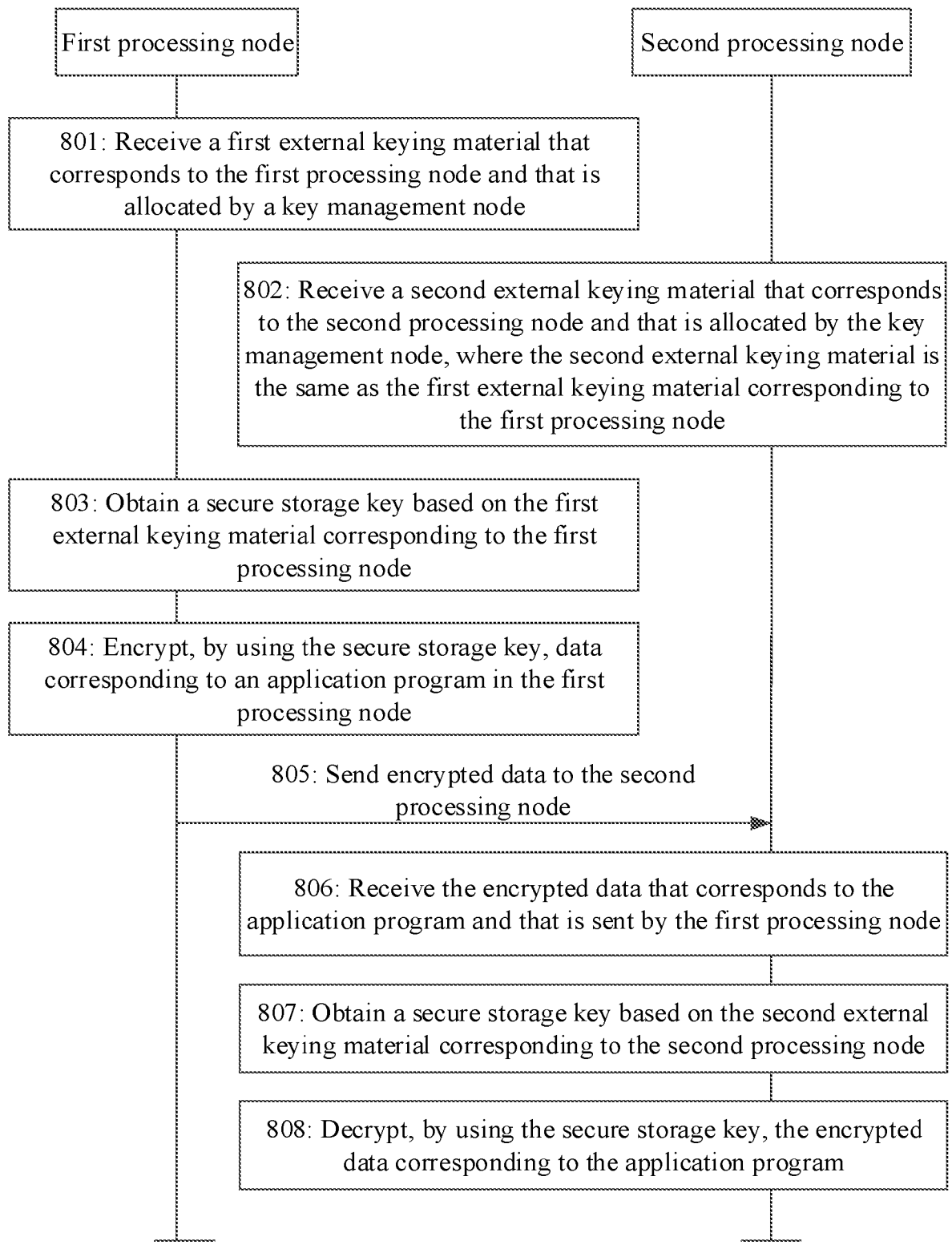
FIG. 8 is a flowchart of another data management method according to an embodiment of this application.

For example, FIG. 8 is a flowchart of another data management method according to an embodiment of this application. The data management method may be applied to a data management system, and the data management system may include a first processing node (for example, the processing node 51 shown in FIG. 5) and a second processing node (for example, the processing node 52 shown in FIG. 5). A system architecture of any one of the first processing node and the second processing node may be shown in FIG. 6. Refer to FIG. 8. The data management method includes the following steps.

Step 801: The first processing node receives a first external keying material that corresponds to the first processing node and that is allocated by a key management node.

External keying materials allocated by the key management node to processing nodes in a same cluster (cluster) are the same. Optionally, the cluster meets at least one of the following conditions such as a quantity of processing nodes in the cluster is less than a preset quantity; service scenarios of the processing nodes in the cluster are the same (where for example, all the processing nodes in the cluster are processing nodes of a service xx); and the processing nodes in the cluster are located in a same network topology. The quantity of processing nodes in the cluster is less than the preset quantity, so that a quantity of processing nodes that have a same external keying material is small, to ensure security of external keying materials corresponding to the processing nodes in the cluster. The service scenarios of the processing nodes in the cluster are the same, so that application program migration can be performed between the processing nodes in the cluster. The processing nodes in the cluster are located in the same network topology, so that the processing nodes in the cluster can communicate with each other. A person skilled in the art easily understands that the three conditions are merely examples, and cannot be used to limit the implementation solution of this application. In an actual implementation process, the cluster may further meet another condition. This is not limited in this embodiment of this application.

Optionally, a management node (for example, the key management node or another management node, for example, a higher-layer management node, in the data management system) may perform cluster division on a plurality of processing nodes in a cloud computing system to obtain at least one cluster, where each cluster includes at least one processing node, and the cluster meets the foregoing condition. The key management node may allocate an external keying material to the at least one cluster. An external keying material of each cluster is an external keying material corresponding to a processing node in the cluster. Processing nodes in a same cluster correspond to a same external keying material, and the key management node allocates different external keying materials to different clusters. Optionally, the key management node generates, by using a secure random number generator, an external keying material corresponding to each cluster. The external keying material meets a specific strength requirement to ensure security. For example, a length of the external keying material is greater than or equal to 256 bits (bits). In this embodiment of this application, the length of the external keying material may be equal to 256 bits.

After allocating the external keying material to the at least one cluster, the key management node may send, to a processing node in each cluster, an external keying material (namely, an external keying material corresponding to the processing node in the cluster) corresponding to the cluster. Each processing node may receive an external keying material that corresponds to the processing node and that is sent by the key management node. The plurality of processing nodes includes the first processing node, and an external keying material corresponding to the first processing node may be the first external keying material. In this embodiment of this application, an example in which the first processing node obtains the first external keying material from the key management node is used for description. The first processing node may establish a secure communication channel with the key management node. The first processing node sends, to the key management node through the secure communication channel, a key application request that carries an identifier of the first processing node. After receiving the key application request, the key management node determines, based on the identifier of the first processing node carried in the key application request, a cluster to which the first processing node belongs, determines, as the first external keying material corresponding to the first processing node, an external keying material corresponding to the cluster to which the first processing node belongs, and sends the first external keying material to the first processing node through the secure communication channel with the first processing node. The identifier of the first processing node may be an electronic serial number (ESN) of the first processing node. The first processing node and the key management node each have an X.509 identity certificate. The first processing node and the key management node may perform transport layer security (TLS) bidirectional verification based on the X.509 identity certificate, and establish the secure communication channel after the verification succeeds. Optionally, the first processing node has a key importing unit (for example, a key importing application program). The key importing unit may include a normal importing subunit (which is also referred to as a key importing CA, a key management CA, or a key privilege CA) and a secure importing subunit (which is also referred to as a key importing TA, a key management TA, or a key privilege TA). An execution environment of an OS of the first processing node includes a TEE and an REE. The normal management subunit is in the REE, and the secure management subunit is in the TEE. The normal management subunit may perform TLS bidirectional verification with the key management node, establish a secure communication channel, send the key application request to the key management node, and receive the first external keying material sent by the key management node.

Optionally, the first external keying material sent by the key management node to the first processing node is obtained by the key management node through encryption by using a first security key and based on a first encryption algorithm. The first processing node and the key management node each have the first security key and the first encryption algorithm. The first processing node may receive the encrypted first external keying material sent by the key management node. For example, the first security key and the first encryption algorithm are obtained, through negotiation, by the first processing node and the key management node, and the first processing node and the key management node may negotiate the first security key and the first encryption algorithm in a secure environment, to ensure security of the first security key and the first encryption algorithm. Optionally, as described above, the key importing unit of the first processing node includes the normal importing subunit and the secure importing subunit. The normal importing subunit is in the REE, and the secure importing subunit is in the TEE. The secure importing subunit may negotiate, in the TEE, the first security key and the first encryption algorithm with the key management node, to prevent the first security key and the first encryption algorithm from being learned by the normal management subunit.

After receiving the first external keying material that corresponds to the first processing node and that is sent by the key management node, the first processing node may securely store the first external keying material, to ensure security of the first external keying material. Optionally, the first processing node includes a trusted storage unit, and the first processing node may encrypt the first external keying material by using a first material key, and store a corresponding encrypted first external keying material in the trusted storage unit. Optionally, the first external keying material sent by the key management node to the first processing node is obtained by the key management node through encryption by using the first security key and based on the first encryption algorithm. The first processing node first decrypts, by using the first security key and based on the first encryption algorithm, the first external keying material sent by the key management node, then encrypts, by using the first material key, a decrypted first external keying material, and stores an encrypted first external keying material in the trusted storage unit in the first processing node. Optionally, before encrypting the first external keying material by using the first material key, the first processing node may obtain the first material key based on a hardware identifier of the first processing node. As described above, the key importing unit of the first processing node includes the secure importing subunit, and the first processing node may generate the first material key based on a target key derivation algorithm (for example, a PBKDF2 algorithm) and based on the hardware identifier of the first processing node and an identifier (for example, a UUID) of the secure importing subunit. The hardware identifier of the first processing node may be, for example, an HUK of a processor of the first processing node, and the first material key is a trusted storage key (TSK). In this embodiment of this application, a trusted OS in the first processing node and the secure importing subunit in the key importing unit in the first processing node may cooperate to perform the step of securely storing the first external keying material. For example, the key importing unit in the first processing node includes the normal importing subunit and the secure importing subunit. A secure communication channel is established between the normal importing subunit and the secure importing subunit. After receiving the first external keying material sent by the key management node, the normal importing subunit sends the first external keying material to the secure importing subunit through the secure communication channel with the secure importing subunit. After the secure importing subunit decrypts the first external keying material, the trusted OS encrypts the first external keying material by using the first material key. This is not limited in this embodiment of this application.

Step 802: The second processing node receives a second external keying material that corresponds to the second processing node and that is allocated by the key management node, where the second external keying material is the same as the first external keying material corresponding to the first processing node.

Optionally, an external keying material sent by the key management node to the second processing node is obtained by the key management node through encryption by using a second security key and based on a second encryption algorithm. The second processing node and the key management node each have the second security key and the second encryption algorithm. The second processing node may receive an encrypted second external keying material sent by the key management node. The second security key may be the same as or different from the first security key in step 801, and the second encryption algorithm may be the same as or different from the first encryption algorithm in step 801. This is not limited in this embodiment of this application. After receiving the second external keying material sent by the key management node, the second processing node may securely store the second external keying material. Optionally, the second processing node first decrypts, by using the second security key and based on the second encryption algorithm, the second external keying material sent by the key management node, then encrypts, a decrypted second external keying material by using a second material key, and stores an encrypted second external keying material in a trusted storage unit in the second processing node. Before encrypting the second external keying material by using the second material key, the second processing node may obtain the second material key based on a hardware identifier of the second processing node. For example, the second processing node generates the second material key based on a target key derivation algorithm (for example, a PBKDF2 algorithm) and based on the hardware identifier of the second processing node and an identifier (for example, a UUID) of a secure importing subunit in the second processing node. The hardware identifier of the second processing node may be, for example, an HUK of a processor of the second processing node, and the second material key is a TSK.

A detailed implementation process of step 802 is similar to an implementation process of the foregoing step 801, and details are not described herein again.

Step 803: The first processing node obtains a secure storage key based on the first external keying material corresponding to the first processing node.

Optionally, the first processing node obtains, from the trusted storage unit in the first processing node, the first external keying material corresponding to the first processing node, where the first external keying material obtained by the first processing node is encrypted by using the first material key. The first processing node obtains the first material key based on the hardware identifier of the first processing node, decrypts, by using the first material key, the first external keying material obtained from the trusted storage unit, to obtain a decrypted first external keying material, and generates the secure storage key based on the target key derivation algorithm and based on the decrypted first external keying material. For a process in which the first processing node obtains the first material key based on the hardware identifier of the first processing node, refer to step 801. For a process in which the first processing node generates the secure storage key based on the target key derivation algorithm and based on the first external keying material, refer to step 701 in the embodiment shown in FIG. 7. Details are not described herein again in this embodiment of this application.

Step 804: The first processing node encrypts, by using the secure storage key, data corresponding to an application program in the first processing node.

Step 805: The first processing node sends encrypted data to the second processing node.

Step 806: The second processing node receives the encrypted data that corresponds to the application program and that is sent by the first processing node.

For an implementation process of step 804 to step 806, refer to step 702 to step 704 in the embodiment shown in FIG. 7. Details are not described in this embodiment of this application again.

Step 807: The second processing node obtains a secure storage key based on the second external keying material corresponding to the second processing node.

Optionally, the second processing node obtains, from the trusted storage unit in the second processing node, the second external keying material corresponding to the second processing node, where the second external keying material obtained by the second processing node is encrypted by using the second material key. The second processing node obtains the second material key based on the hardware identifier of the second processing node, decrypts, by using the second material key, the second external keying material obtained from the trusted storage unit, to obtain a decrypted second external keying material, and generates the secure storage key based on the target key derivation algorithm and based on the decrypted second external keying material. For a process in which the second processing node obtains the second material key based on the hardware identifier of the second processing node, refer to step 802. For a process in which the second processing node generates the secure storage key based on the target key derivation algorithm and based on the second external keying material, refer to step 705 in the embodiment shown in FIG. 7. Details are not described herein again in this embodiment of this application.

Step 808: The second processing node decrypts, by using the secure storage key, the encrypted data corresponding to the application program.

For an implementation process of step 808, refer to step 706 in the embodiment shown in FIG. 7. Details are not described herein again.

In conclusion, according to the data management method provided in this embodiment of this application, after obtaining a secure storage key based on a first external keying material corresponding to a first processing node, the first processing node encrypts, by using the secure storage key, data corresponding to an application program in the first processing node, and sends, to a second processing node, encrypted data corresponding to the application program. The second processing node receives the encrypted data that corresponds to the application program and that is sent by the first processing node, obtains a secure storage key based on a second external keying material corresponding to the second processing node, and decrypts, by using the secure storage key, the encrypted data corresponding to the application program. The second external keying material is the same as the first external keying material. Therefore, the second processing node and the first processing node may obtain a same secure storage key, and the second processing node may successfully decrypt the encrypted data that corresponds to the application program and that is sent by the first processing node. This helps improve data management flexibility.

The data management method provided in this embodiment of this application provides a universal ciphertext data migration service, so that a secure storage key can be decoupled from an HUK of a processing node (for example, a server) without increasing complexity of an application program, and impact on performance of the processing node is small. In addition, in a process of migrating ciphertext data, the ciphertext data does not need to be decrypted and then encrypted. Therefore, ciphertext data migration efficiency is high, the ciphertext data can still be recovered when a hardware fault such as a processor damage occurs on the processing node, and efficient cross-node data secure storage, migration, and recovery are implemented. In addition, compared with a solution of sharing a secure storage key, in this solution, the secure storage key provided in the data management method is obtained based on a plurality of keying materials, and the secure storage key has high security.

As described above, it is easy to understand that the data management method provided in this embodiment of this application includes three phases such as a keying material importing phase (for example, a key management node imports an external keying material to a processing node), a data encryption phase, and a data decryption phase that exists after application program migration. The following separately describes the three phases with reference to a system architecture of the processing node.

Figure 9:
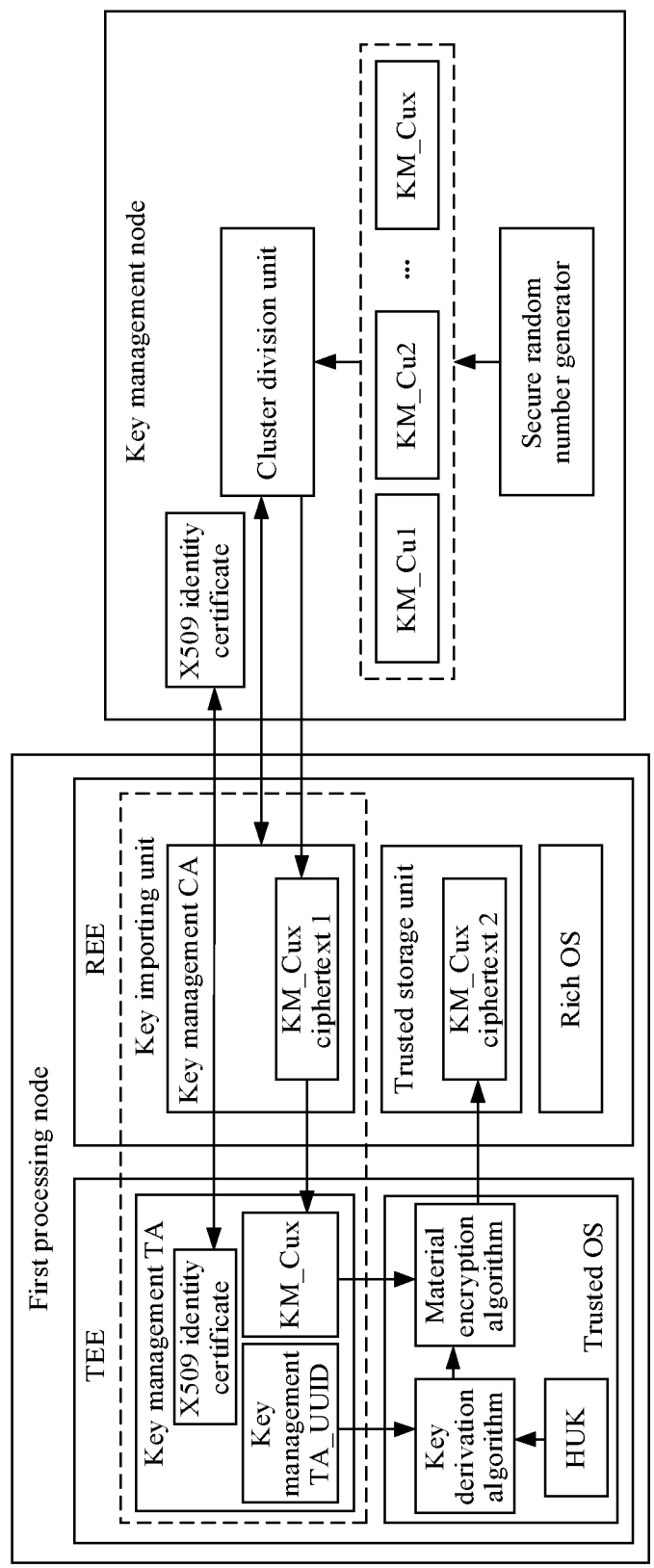
FIG. 9 is a schematic diagram of a keying material importing process according to an embodiment of this application.

For example, FIG. 9 is a schematic diagram of a keying material importing process according to an embodiment of this application. In FIG. 9, an example in which an external keying material is imported to a first processing node (for example, the processing node 51 in FIG. 5) is used for description. As shown in FIG. 9, a secure random number generator in a key management node generates a plurality of external keying materials, which are respectively KM_Cu1, KM_Cu2, . . . , and KM_Cux. A cluster division unit in the key management node may allocate external keying materials to a plurality of clusters (where each cluster includes at least one processing node). Herein, an example in which the cluster division unit in the key management node allocates a first external keying material to the first processing node is used for description. A key management CA in the first processing node and the cluster division unit in the key management node perform TLS bidirectional verification based on an X509 identity certificate (where the X509 identity certificate in the first processing node is located in a key management TA in the first processing node to ensure security), and after the verification succeeds, a secure communication channel is established between the key management CA in the first processing node and the cluster division unit in the key management node. After the secure communication channel is successfully established, the key management TA in the first processing node negotiates a first security key and a first encryption algorithm with the cluster division unit in the key management node by using the key management CA in the first processing node. After the negotiation is completed, the key management CA in the first processing node sends, to the cluster division unit in the key management node through the secure communication channel with the cluster division unit in the key management node, a key application request that carries an identifier of the first processing node. After receiving the key application request, the cluster division unit in the key management node determines, based on the identifier of the first processing node carried in the key application request, that the first external keying material corresponding to the first processing node is KM_Cux. Then, the cluster division unit in the key management node encrypts the first external keying material KM_Cux by using the first security key and the first encryption algorithm that are obtained through negotiation with the key management TA in the first processing node, to obtain KM_Cux ciphertext 1, and transmits the KM_Cux ciphertext 1 to the key management CA in the first processing node through the secure communication channel with the key management CA in the first processing node. After receiving the KM_Cux ciphertext 1, the key management CA in the first processing node transmits the KM_Cux ciphertext 1 to the key management TA in the first processing node, and the key management TA in the first processing node decrypts the KM_Cux ciphertext 1 by using the first security key and the first encryption algorithm that are obtained through negotiation with the cluster division unit in the key management node, to obtain KM_Cux (namely, KM_Cux plaintext), and transmits KM_Cux and a UUID (namely, key management TA_UUID in FIG. 9) of the key management TA in the first processing node to a trusted OS in the first processing node. After receiving KM_Cux and key management TA_UUID, the trusted OS in the first processing node generates a first keying material based on a key derivation algorithm (for example, a PBKDF2 algorithm) and based on key management TA_UUID and an HUK of a processor of the first processing node, encrypts KM_Cux by using the first keying material to obtain KM_Cux ciphertext 2, and stores the KM_Cux ciphertext 2 in a trusted storage unit of the first processing node. In this way, the first external keying material KM_Cux is imported to the first processing node.

Figure 10:
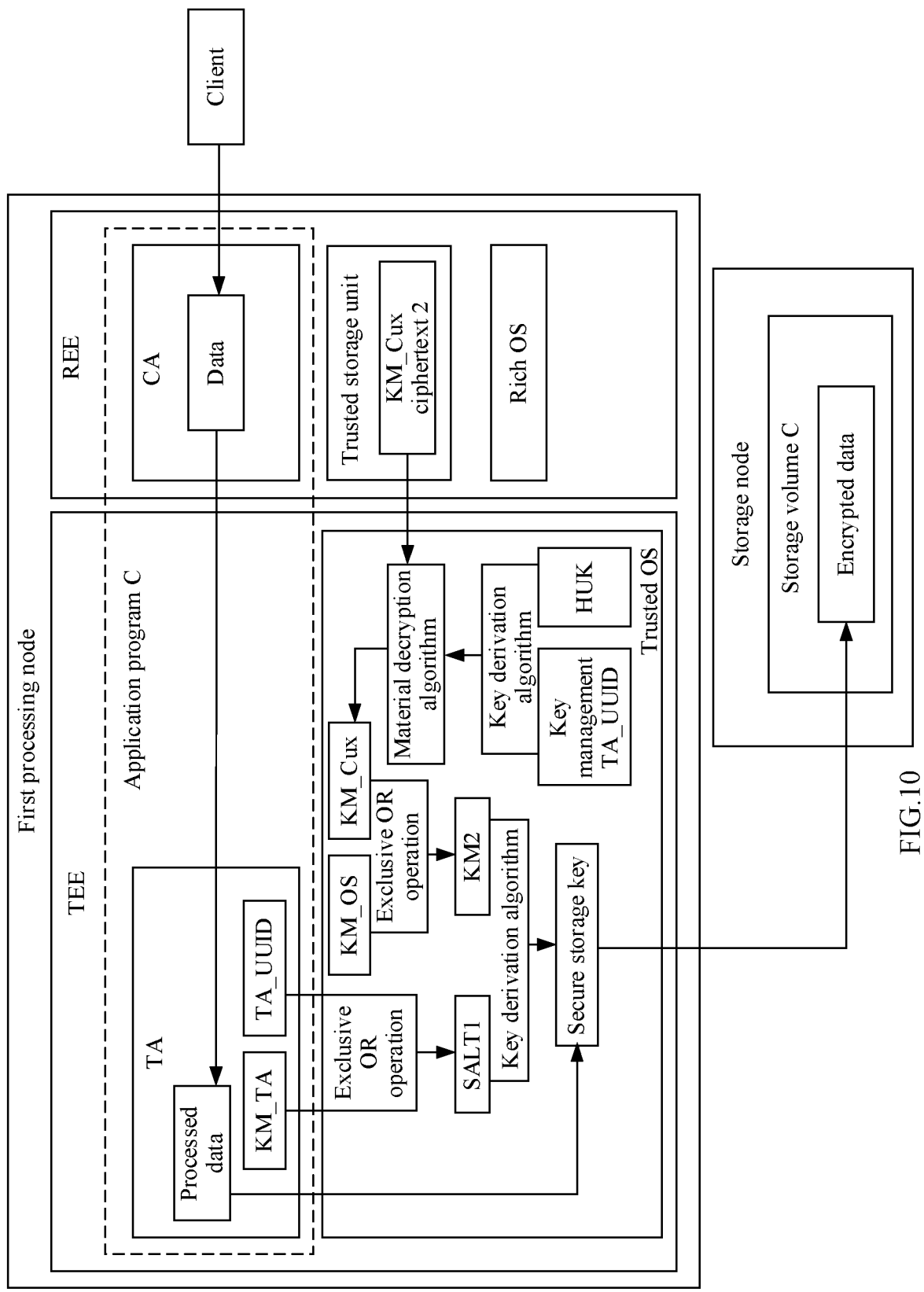
FIG. 10 is a schematic diagram of a data encryption process according to an embodiment of this application.

For example, FIG. 10 is a schematic diagram of a data encryption process according to an embodiment of this application. In FIG. 10, an example in which the data encryption process is applied to a first processing node (for example, the processing node 51 in FIG. 5) is used for description. As shown in FIG. 10, a client sends, to the first processing node, data corresponding to an application program C. The data corresponding to the application program C is received by a CA of the application program C in the first processing node. The CA of the application program C transmits, to a corresponding TA, the data corresponding to the application program C. The TA of the application program C processes the data transmitted by the CA of the application program C to obtain processed data. Then, the TA of the application program C sends an encrypted storage request to a trusted OS of the first processing node, where the encrypted storage request may carry an internal keying material KM_TA corresponding to the TA of the application program C, an identifier TA_UUID of the TA of the application program C, and the processed data. After receiving the encrypted storage request, the trusted OS in the first processing node obtains, from a trusted storage unit of the first processing node, a first external keying material (namely, KM_Cux ciphertext 2) corresponding to the first processing node, generates a first keying material based on a key derivation algorithm (for example, a PBKDF2 algorithm) and based on an identifier (namely, key management TA_UUID in FIG. 10, where the key management TA is not shown in FIG. 10, and for the key management TA, refer to FIG. 9) of a key management TA in the first processing node and an HUK of a processor of the first processing node, and decrypts the KM_Cux ciphertext 2 by using the first keying material and based on a material decryption algorithm to obtain KM_Cux (namely, KM_Cux plaintext). Then, the trusted OS in the first processing node performs an exclusive OR operation on the internal keying material KM_TA corresponding to the TA of the application program C and the identifier TA UUID of the TA of the application program C to obtain a first initial key SALT1, performs an exclusive OR operation on an internal keying material KM_OS corresponding to the trusted OS and the first external keying material KM_Cux to obtain a second initial key KM2, and generates a secure storage key based on the key derivation algorithm (for example, the PBKDF2 algorithm) and based on the first initial key SALT1 and the second initial key KM2. Then, the trusted OS in the first processing node encrypts, by using the secure storage key, the processed data carried in the encrypted storage request, and stores encrypted data in a storage volume C that corresponds to the application program C and that is in a storage node. In this way, the data encryption process in this embodiment of this application is completed. Optionally, after receiving the data that corresponds to the application program C and that is sent by the client, the CA of the application program C may transmit, to the corresponding TA, crucial data in the data corresponding to the application program C, to perform the foregoing data encryption process. The CA of the application program C processes normal data in the data corresponding to the application program C, and stores, in the storage volume C that corresponds to the application program C and that is in the storage node, processed normal data corresponding to the application program C. This is not limited in this embodiment of this application.

Figure 11:
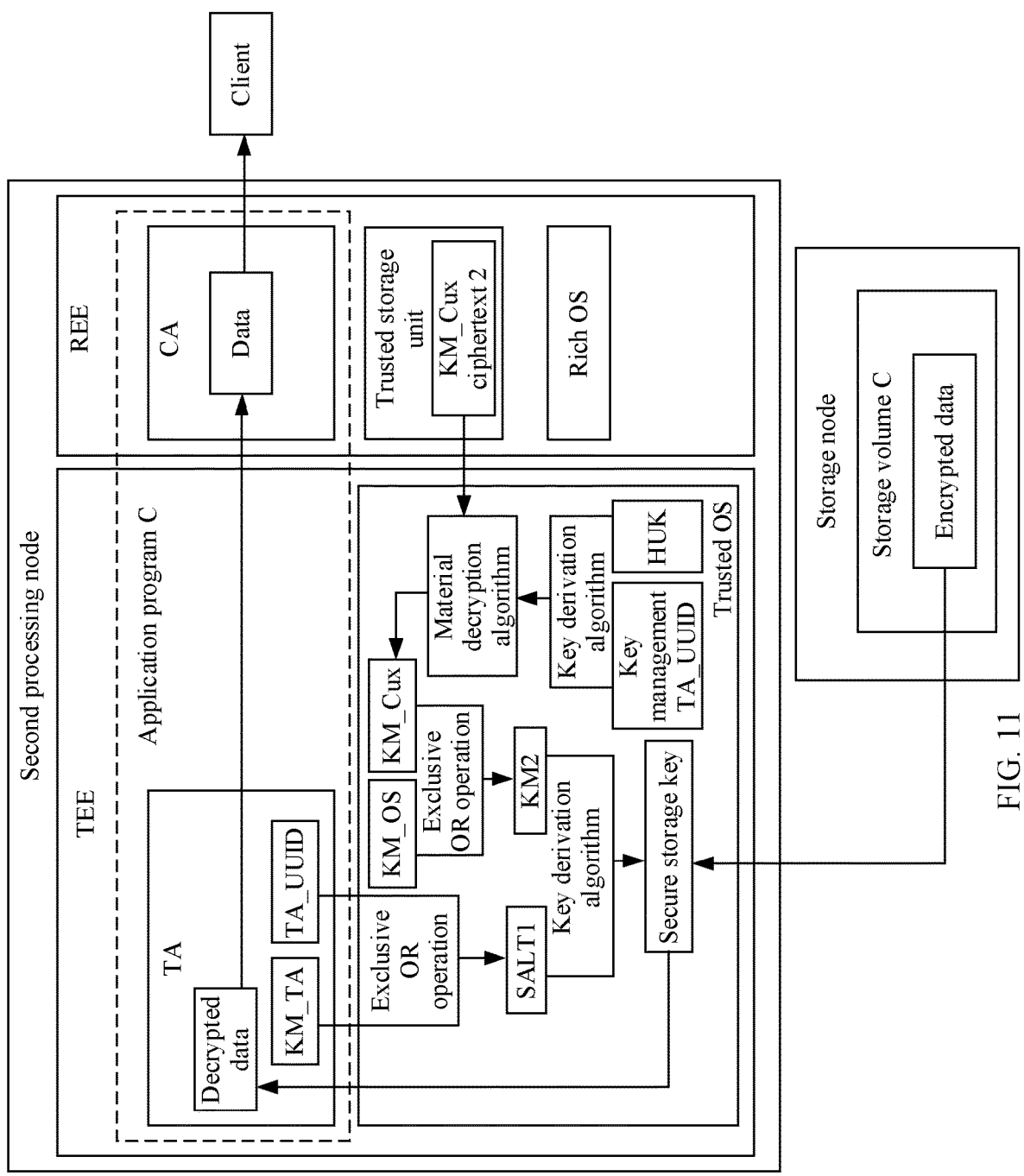
FIG. 11 is a schematic diagram of a data decryption process according to an embodiment of this application.

For example, FIG. 11 is a schematic diagram of a data decryption process according to an embodiment of this application. In FIG. 11, an example in which the data decryption process is applied to a second processing node (for example, the processing node 52 in FIG. 5) is used for description. As shown in FIG. 11, a client may send, to the second processing node, a service request corresponding to an application program C, to trigger the second processing node to perform the data decryption process. For example, under triggering of the client, a trusted OS in the second processing node obtains, from a storage volume C that corresponds to the application program C and that is in a storage node, encrypted data corresponding to the application program C. Then, the trusted OS in the second processing node obtains, from a trusted storage unit in the second processing node, a second external keying material (namely, KM_Cux ciphertext 2) corresponding to the second processing node, generates a second keying material based on a key derivation algorithm (for example, a PBKDF2 algorithm) and based on an identifier (namely, key management TA_UUID in FIG. 11, where the key management TA is not shown in FIG. 11) of a key management TA in the second processing node and an HUK of a processor of the second processing node, and decrypts the KM_Cux ciphertext 2 by using the second keying material to obtain KM_Cux (namely, KM_Cux plaintext). Then, the trusted OS in the second processing node performs an exclusive OR operation on an internal keying material KM_TA corresponding to a TA of the application program C and an identifier TA_UUID of the TA of the application program C to obtain a first initial key SALT1, performs an exclusive OR operation on an internal keying material KM_OS (namely, a second internal keying material) corresponding to the trusted OS and the second external keying material KM_Cux to obtain a second initial key KM2, and generates a secure storage key based on the key derivation algorithm (for example, the PBKDF2 algorithm) and based on the first initial key SALT1 and the second initial key KM2. Then, the trusted OS in the second processing node decrypts, by using the secure storage key, the encrypted data that corresponds to the application program C and that is obtained from the storage node, to obtain decrypted data, and transmits the decrypted data to the TA of the application program C. The TA of the application program C transmits the decrypted data to a CA of the application program C, and the CA of the application program C transmits the decrypted data to the client to respond to the service request of the client. In this way, the data decryption process in this embodiment of this application is completed.

The following describes a data management process provided in embodiments of this application with reference to the accompanying drawings.

Figure 12A:
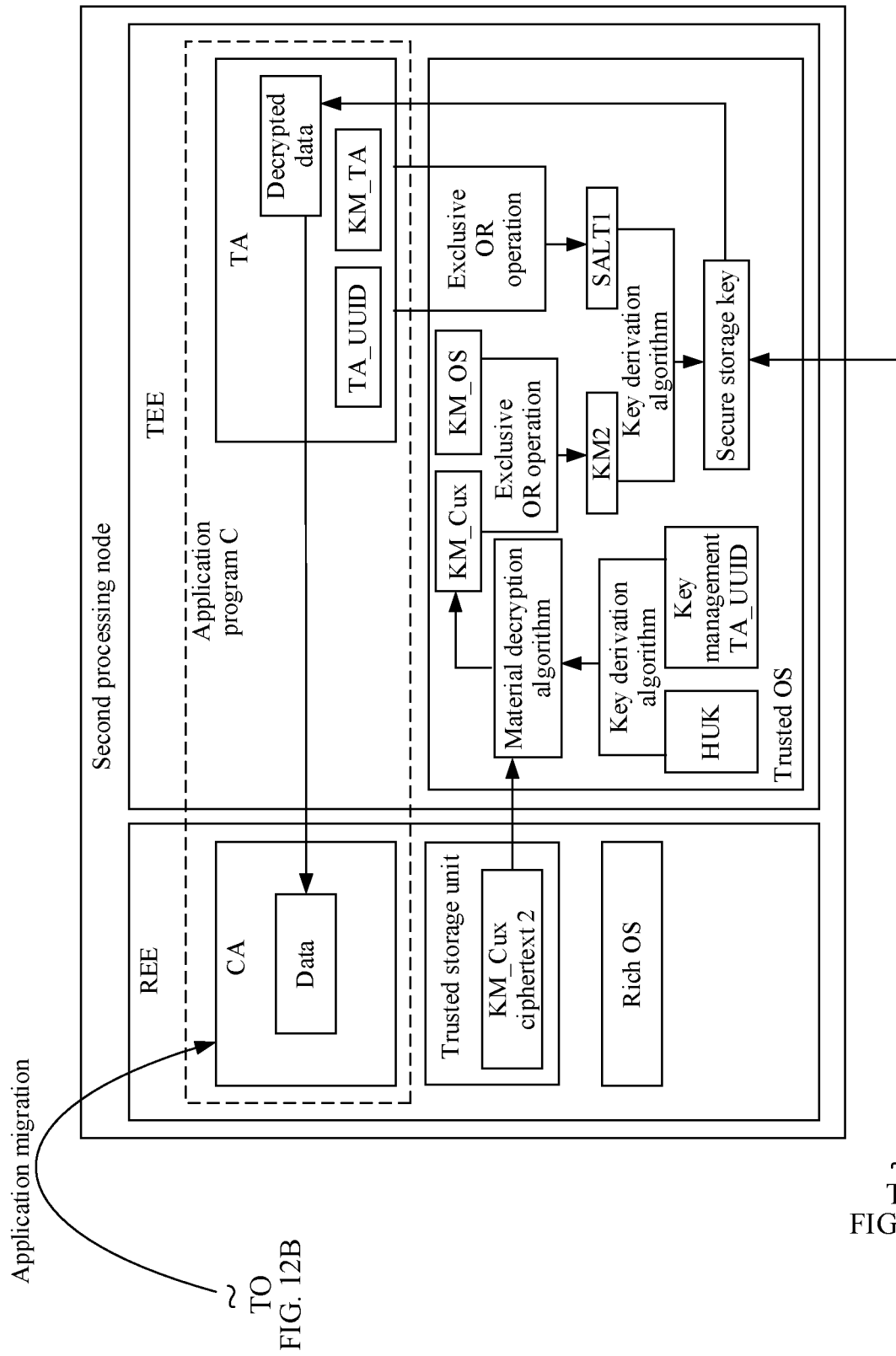
FIG. 12A and FIG. 12B are a schematic diagram of a data management process according to an embodiment of this application.
Figure 12B:
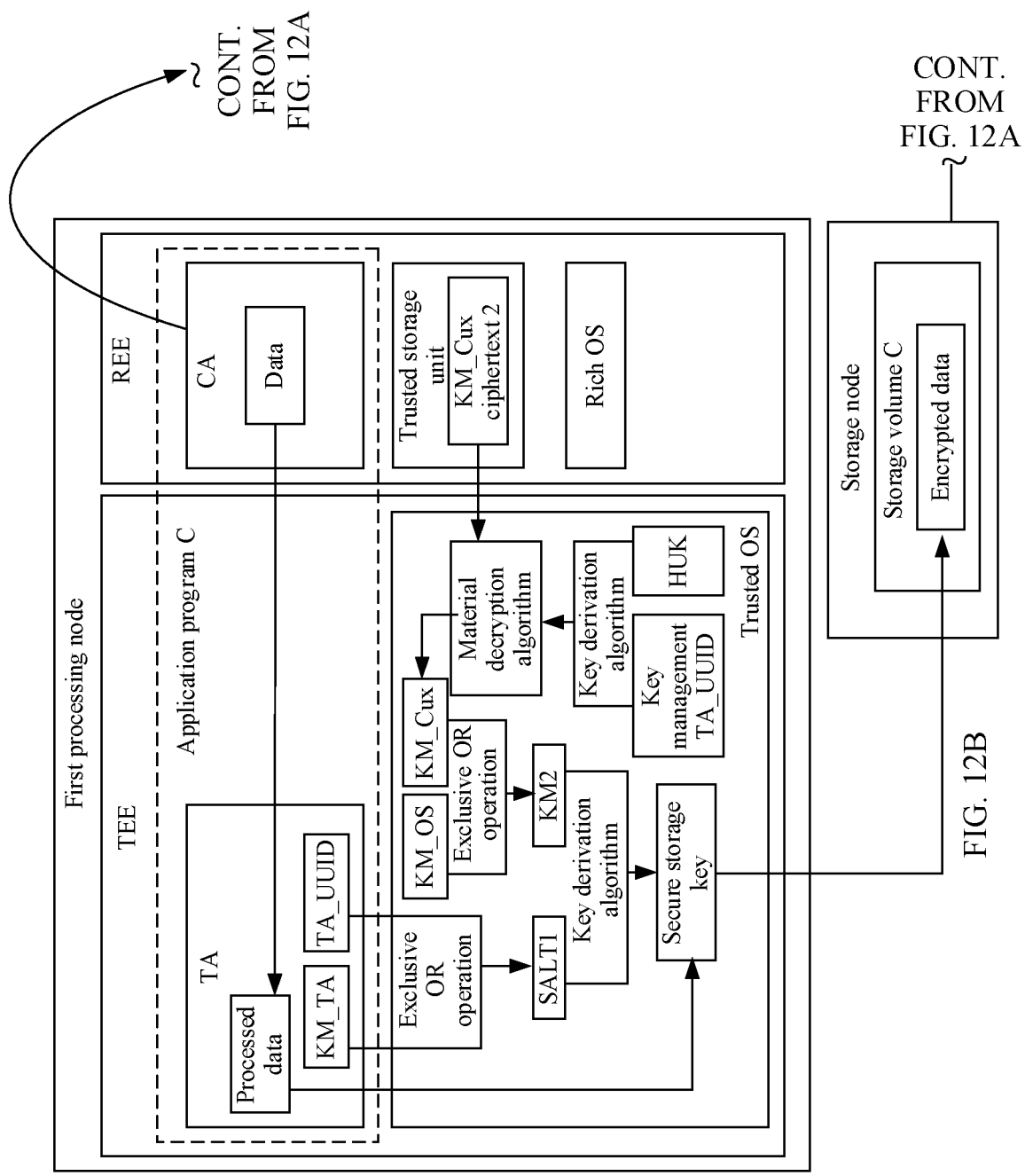

For example, FIG. 12A and FIG. 12B are a schematic diagram of a data management process according to an embodiment of this application. A first external keying material KM_Cux corresponding to a first processing node is the same as a second external keying material KM_Cux corresponding to a second processing node, and a first internal keying material KM_OS corresponding to the first processing node is the same as a second internal keying material KM_OS corresponding to the second processing node. When an application program C is located in the first processing node, a trusted OS in the first processing node generates a secure storage key based on the first external keying material KM_Cux, the first internal keying material KM_OS, and an application internal keying material (namely, an internal keying material corresponding to the application program C, including KM_TA and TA_UUID in FIG. 12A and FIG. 12B), encrypts, by using the secure storage key, data (namely, the processed data in FIG. 12A and FIG. 12B) corresponding to the application program C, and stores encrypted data in a storage volume C that corresponds to the application program C and that is in a storage node. After the application program C is migrated from the first processing node to the second processing node, a mounting node of the storage volume C that corresponds to the application program C and that is in the storage node is switched from the first processing node to the second processing node. A trusted OS in the second processing node obtains, from the storage volume C that corresponds to the application program C and that is in the storage node, the encrypted data corresponding to the application program C. Then, the trusted OS in the second processing node generates a secure storage key based on the second external keying material KM_Cux, the second internal keying material KM_OS, and an application internal keying material (namely, the internal keying material corresponding to the application program C, including KM_TA and TA_UUID in FIG. 12A and FIG. 12B), and decrypts, by using the secure storage key, the encrypted data corresponding to the application program C. Because the first external keying material KM_Cux is the same as the second external keying material KM_Cux, the first internal keying material KM_OS is the same as the second internal keying material KM_OS, and the application internal keying materials are internal keying materials corresponding to a same application program C, the second processing node and the first processing node may generate a same secure storage key, and the second processing node may successfully decrypt, by using the same secure storage key, the encrypted data that corresponds to the application program C and that is decrypted by the first processing node, to recover the encrypted data.

The following provides apparatus embodiments of this application that may be used to perform the method embodiments of this application. For details not disclosed in the apparatus embodiments of this application, refer to the method embodiments of this application.

Figure 13:
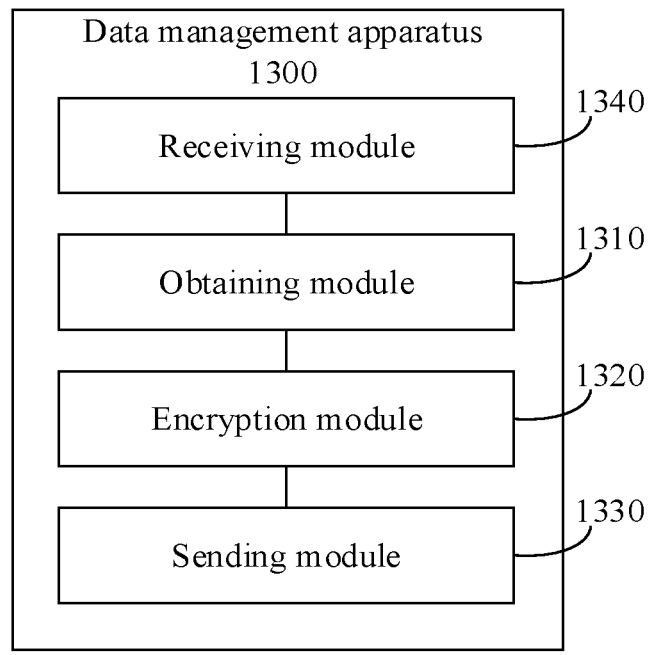
FIG. 13 is a schematic diagram of a logical structure of a data management apparatus according to an embodiment of this application.

FIG. 13 is a schematic diagram of a logical structure of a data management apparatus 1300 according to an embodiment of this application. The data management apparatus 1300 may be used in a first processing node in a data management system. For example, the data management apparatus 1300 may be the first processing node or a functional component in the first processing node. The first processing node may be the processing node 51 in FIG. 5, and the first processing node may be a server. Refer to FIG. 13. The data management apparatus 1300 may include but is not limited to an obtaining module 1310, configured to obtain a secure storage key based on a first external keying material corresponding to the first processing node, where the obtaining module 1310 may be configured to perform step 701 and step 803; an encryption module 1320, configured to encrypt, by using the secure storage key, data corresponding to an application program in the first processing node, where the encryption module 1320 may be configured to perform step 702 and step 804; and a sending module 1330, configured to send encrypted data to a second processing node, where a second external keying material corresponding to the second processing node is the same as the first external keying material, and the sending module 1330 may be configured to perform step 703 and step 805.

Optionally, the obtaining module 1310 is configured to obtain the secure storage key based on the first external keying material, and a first internal keying material corresponding to the first processing node or an application internal keying material corresponding to the application program, where a second internal keying material corresponding to the second processing node is the same as the first internal keying material.

Optionally, a trusted OS is configured in the first processing node, the application program includes a trusted application, the first internal keying material is an internal keying material corresponding to the trusted OS, and the application internal keying material is an internal keying material corresponding to the trusted application.

Optionally, an execution environment of an OS of the first processing node includes a TEE, and both the trusted OS and the trusted application are in the TEE.

Optionally, still refer to FIG. 13. The data management apparatus 1300 further includes a receiving module 1340, configured to, before the obtaining module 1310 obtains the secure storage key based on the first external keying material corresponding to the first processing node, receive the first external keying material allocated by a key management node, where external keying materials allocated by the key management node to processing nodes in a same cluster are the same. The receiving module 1340 may be configured to perform step 801.

Optionally, the cluster meets at least one of the following conditions such as service scenarios of the processing nodes in the cluster are the same; a quantity of processing nodes in the cluster is less than a preset quantity; and the processing nodes in the cluster are located in a same network topology.

Optionally, the receiving module 1340 is configured to receive encrypted first external keying material sent by the key management node, where the encrypted first external keying material is obtained by the key management node through encryption by using a first security key and based on a first encryption algorithm, and the first processing node and the key management node each have the first security key and the first encryption algorithm.

Optionally, the sending module 1330 is configured to send the encrypted data to a storage node, where the storage node is configured to send the encrypted data to the second processing node.

In conclusion, according to the data management apparatus provided in this embodiment of this application, after obtaining a secure storage key based on a first external keying material corresponding to a first processing node, the first processing node encrypts, by using the secure storage key, data corresponding to an application program in the first processing node, and sends, to a second processing node, encrypted data corresponding to the application program, where a second external keying material corresponding to the second processing node is the same as the first external keying material. Therefore, the second processing node may obtain, based on the second external keying material, a secure storage key that is the same as that of the first processing node, and may successfully decrypt, by using the secure storage key, the encrypted data that corresponds to the application program and that is sent by the first processing node. This helps improve data management flexibility.

Figure 14:
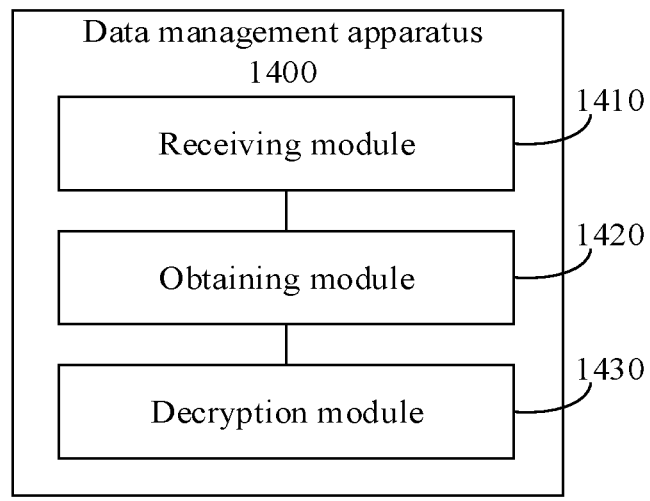
FIG. 14 is a schematic diagram of a logical structure of another data management apparatus according to an embodiment of this application.

FIG. 14 is a schematic diagram of a logical structure of another data management apparatus 1400 according to an embodiment of this application. The data management apparatus 1400 may be used in a second processing node in a data management system. For example, the data management apparatus 1400 may be the second processing node or a function component in the second processing node. The second processing node may be the processing node 52 in FIG. 5, and the second processing node may be a server. Refer to FIG. 14. The data management apparatus 1400 may include but is not limited to a receiving module 1410, configured to receive encrypted data that corresponds to an application program and that is sent by a first processing node, where the receiving module 1410 may be configured to perform step 704 and step 806; an obtaining module 1420, configured to obtain a secure storage key based on a second external keying material corresponding to the second processing node, where the second external keying material is the same as a first external keying material corresponding to a first processing node, and the obtaining module 1420 may be configured to perform step 705 and step 807; and a decryption module 1430, configured to decrypt, by using the secure storage key, the encrypted data corresponding to the application program, where the decryption module 1430 may be configured to perform step 706 and step 808.

Optionally, the obtaining module 1420 is configured to obtain the secure storage key based on the second external keying material, and a second internal keying material corresponding to the second processing node or an application internal keying material corresponding to the application program, where the second internal keying material is the same as a first internal keying material corresponding to the first processing node.

Optionally, a trusted OS is configured in the second processing node, the application program includes a trusted application, the second internal keying material is an internal keying material corresponding to the trusted OS, and the application internal keying material is an internal keying material corresponding to the trusted application.

Optionally, an execution environment of an OS of the second processing node includes a TEE, and both the trusted OS and the trusted application are in the TEE.

Optionally, the receiving module 1410 is further configured to, before the obtaining module 1420 obtains the secure storage key based on the second external keying material corresponding to the second processing node, receive the second external keying material allocated by a key management node, where external keying materials allocated by the key management node to processing nodes in a same cluster are the same. The receiving module 1410 may be further configured to perform step 802.

Optionally, the receiving module 1410 is configured to receive the encrypted second external keying material sent by the key management node, where the encrypted second external keying material is obtained by the key management node through encryption by using a second security key and based on a second encryption algorithm, and the second processing node and the key management node each have the second security key and the second encryption algorithm.

In conclusion, according to the data management apparatus provided in this embodiment of this application, a second processing node receives encrypted data that corresponds to an application program and that is sent by a first processing node, obtains a secure storage key based on a second external keying material corresponding to the second processing node, and decrypts, by using the secure storage key, encrypted data corresponding to the application program, where the second external keying material is the same as a first external keying material corresponding to the first processing node. Therefore, the secure storage key obtained by the second processing node based on the second external keying material is the same as a secure storage key obtained by the first processing node based on the first external keying material, and the second processing node may successfully decrypt, by using the secure storage key, the encrypted data that corresponds to the application program and that is sent by the first processing node. This helps improve data management flexibility.

Figure 15:
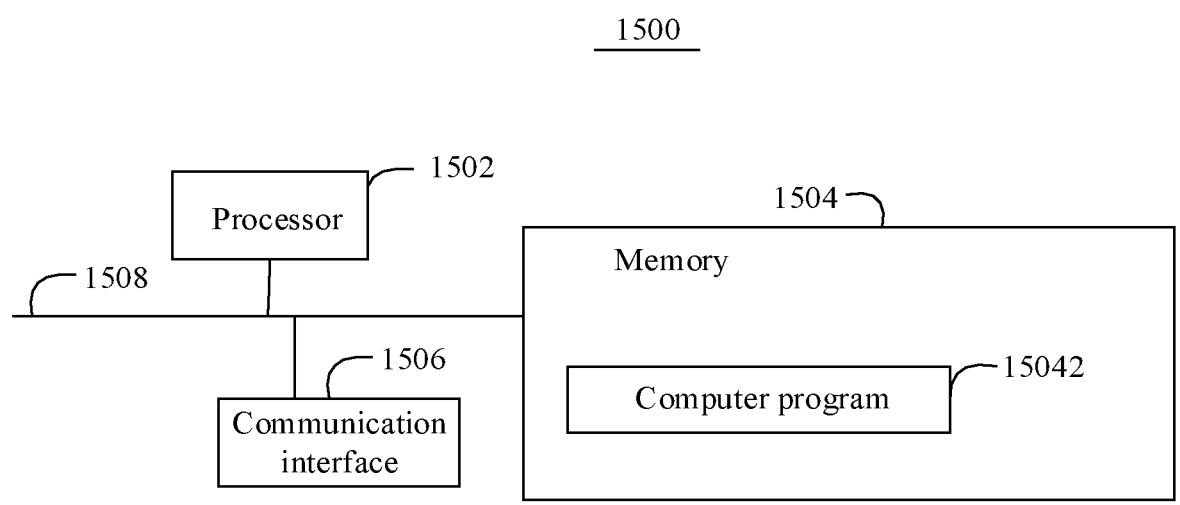
FIG. 15 is a schematic diagram of a hardware structure of a computer device according to an embodiment of this application.

FIG. 15 is a schematic diagram of a hardware structure of a computer device 1500 according to an embodiment of this application. The computer device 1500 may be the foregoing first processing node or second processing node, and the computer device 1500 may be a server. Refer to FIG. 15. The computer device 1500 includes a processor 1502, a memory 1504, a communication interface 1506, and a bus 1508. The processor 1502, the memory 1504, and the communication interface 1506 are communicatively connected to each other by using the bus 1508. A person skilled in the art should understand that a connection manner between the processor 1502, the memory 1504, and the communication interface 1506 shown in FIG. 15 is merely an example. In an implementation process, the processor 1502, the memory 1504, and the communication interface 1506 may alternatively be communicatively connected to each other in a connection manner other than the bus 1508.

The memory 1504 may be configured to store a computer program 15042. The computer program may include instructions and data. In this embodiment of this application, the memory 1504 may be various types of storage media, for example, a random-access memory (RAM), a read-only memory (ROM), a non-volatile RAM (NVRAM), a programmable ROM (PROM), an erasable PROM (EPROM), an electrically-erasable PROM (EEPROM), a flash memory, an optical memory, a register, and the like. In addition, the memory 1504 may include a hard disk and/or a memory.

The processor 1502 may be a general-purpose processor. The general-purpose processor may be a processor that reads and executes a computer program (for example, the computer program 15042) stored in the memory (for example, the memory 1504) to perform a step and/or operation. In a process of performing the foregoing step and/or operation, the general-purpose processor may use data stored in the memory (for example, the memory 1504). The general-purpose processor may be, for example, but is not limited to, a CPU. In addition, the processor 1502 may alternatively be a dedicated processor. The dedicated processor may be a specially designed processor configured to perform a step and/or operation. The dedicated processor may be, for example, but is not limited to, a digital signal processor (DSP), an application-specific integrated circuit (ASIC), or a programmable logic device (PLD). The PLD may be a complex program logic device (CPLD), a field-programmable gate array (FPGA), generic array logic (GAL), or any combination thereof In addition, the processor 1502 may alternatively be a combination of a plurality of processors, for example, a multi-core processor. The processor 1502 may include at least one circuit, to perform all or some of the steps of the data management method provided in the foregoing embodiments.

The communication interface 1506 may include an interface that is used to implement component interconnection inside the computer device 1500, for example, an I/O interface, a physical interface, and a logical interface, and an interface that is used to implement interconnection between the computer device 1500 and another device (for example, user equipment in which a client is located). The physical interface may be a gigabit Ethernet (GE) interface, and may be used to implement interconnection between the computer device 1500 and another device. The logical interface is an interface inside the computer device 1500, and may be used to implement interconnection of components inside the computer device 1500. It is easy to understand that the communication interface 1506 may be used for communication between the computer device 1500 and another device. For example, the communication interface 1506 is used for information sending and receiving between the computer device 1500 and another device.

The bus 1508 may be any type of communication bus, for example, a system bus, used to implement interconnection between the processor 1502, the memory 1504, and the communication interface 1506.

The foregoing components may be separately disposed on chips that are independent of each other, or at least some or all of the components may be disposed on a same chip. Whether the components are separately disposed on different chips or integrated and disposed on one or more chips usually depends on a requirement of a product design.

Embodiments of this application impose no limitation on specific implementations of the foregoing components.

In this embodiment of this application, the computer device 1500 includes a secure world and a normal world. An execution environment corresponding to the secure world is a TEE, and an execution environment corresponding to the normal world is an REE. The secure world and the normal world each have an independent system resource. The system resource includes at least one of a hardware resource and a software resource. The hardware resource includes but is not limited to the foregoing processor, memory, communication interface, bus, and the like. The computer device 1500 mainly uses the system resource in the TEE to perform the data management method provided in embodiments of this application. This is not limited in embodiments of this application.

It may be understood that the computer device 1500 shown in FIG. 15 is merely an example. In an implementation process, the computer device 1500 may further include other components, which are not listed one by one in this specification. The computer device 1500 shown in FIG. 15 may perform data management by performing all or some of the steps of the data management method provided in the foregoing embodiments.

An embodiment of this application provides a computer-readable storage medium. The computer-readable storage medium stores a computer program, and when the computer program is executed by a processor, all or some of the steps of the methods provided in the foregoing method embodiments are implemented.

An embodiment of this application provides a computer program product including instructions. When the computer program product is run on a computer, the computer is enabled to perform all or some of the steps of the methods provided in the foregoing method embodiments.

An embodiment of this application provides a chip. The chip includes a programmable logic circuit and/or program instructions. When the chip is run, the chip is configured to implement all or some of the steps of the methods provided in the foregoing method embodiments.

An embodiment of this application provides a data management system. The data management system includes at least a first processing node and a second processing node. In a possible implementation, the first processing node includes the data management apparatus 1300 shown in FIG. 13, and the second processing node includes the data management apparatus 1400 shown in FIG. 14. In another possible implementation, at least one of the first processing node and the second processing node is the computer device 1500 shown in FIG. 15.

Optionally, the data management system further includes a storage node. The first processing node is configured to send, to the second processing node via the storage node, data corresponding to an application program.

Optionally, the data management system further includes a management node. The management node is configured to perform cluster division on processing nodes in the data management system in response to a cluster division instruction. The management node may perform cluster division on the processing nodes in the data management system to obtain at least one cluster. The cluster meets at least one of the following conditions such as service scenarios of the processing nodes in the cluster are the same; a quantity of processing nodes in the cluster is less than a preset quantity; and the processing nodes in the cluster are located in a same network topology.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, but cannot be understood as an indication or implication of relative importance. The term "at least one" refers to one or more, and the term "a plurality of" refers to two or more than two, unless expressly limited otherwise. The term "and/or" describes only an association relationship between associated objects and indicates that there may be three relationships. For example, A and/or B may represent the following three cases such as only A exists, both A and B exist, and only B exists.

For different types of embodiments such as the method embodiment and the apparatus embodiment provided in embodiments of this application, refer to each other. This is not limited in embodiments of this application. A sequence of the operations of the method embodiment provided in embodiments of this application can be properly adjusted, and the operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this application, it should be understood that the disclosed apparatus and the like may be implemented in other composition manners. For example, the described apparatus embodiment is merely an example. For example, division into the units is merely logical function division. During actual implementation, there may be other division manners. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts described as units may or may not be physical units, that is, may be located at one position, or may be distributed on a plurality of network devices (for example, terminal devices). Some or all of the units may be selected based on actual requirements to achieve the objectives of the solutions of embodiments.

The foregoing descriptions are example implementations of this application, and are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A data management method, implemented by a first processing node in a data management system, wherein the data management method comprises:
   receiving, from a key management node, a first external keying material corresponding to the first processing node and comprising a randomly generated number, wherein the first external keying material corresponds to a cluster that the first processing node belongs, and wherein external keying materials allocated at the key management node to processing nodes in a same cluster are the same;
   generating a secure storage key based on the first external keying material;
   encrypting, using the secure storage key, data corresponding to an application program in the first processing node to obtain encrypted data; and
   sending the encrypted data to a second processing node, wherein a second external keying material corresponds to the second processing node and is the same as the first external keying material.

2. The data management method of claim 1, wherein generating the secure storage key comprises generating the secure storage key based on the first external keying material and based on a first internal keying material corresponding to the first processing node or an application internal keying material corresponding to the application program, and wherein a second internal keying material corresponding to the second processing node is the same as the first internal keying material.

3. The data management method of claim 2, further comprising configuring a trusted operating system in the first processing node, wherein the application program comprises a trusted application, wherein the first internal keying material corresponds to the trusted operating system, and wherein the application internal keying material corresponds to the trusted application.

4. The data management method of claim 3, further comprising:
   running an operating system;
   configuring an execution environment in the operating system; and
   configuring a trusted execution environment (TEE) in the execution environment,
   wherein the trusted operating system and the trusted application are in the TEE.

5. The data management method of claim 1, wherein the cluster meets at least one of the following conditions:
   service scenarios of the processing nodes in the cluster are the same;
   a quantity of processing nodes in the cluster is less than a preset quantity; or
   processing nodes in the cluster are located in a same network topology.

6. The data management method of claim 1, wherein the encrypted first external keying material is based on encryption using a first security key and based on a first encryption algorithm, and wherein the first processing node and the key management node each have the first security key and the first encryption algorithm.

7. The data management method of claim 1, wherein sending the encrypted data comprises sending the encrypted data to a storage node for forwarding to the second processing node.

8. The data management method of claim 1, wherein the data corresponding to the application program comprises a client application of the application program and a trusted application of the application program.

9. A data management method, implemented by a second processing node in a data management system, wherein the data management method comprises:
   receiving, from a key management node, a second external keying material corresponding to the second processing node and comprising a randomly generated number, wherein the second external keying material corresponds to a cluster that the second processing node belongs, and wherein external keying materials allocated at the key management node to processing nodes in a same cluster are the same;
   receiving encrypted data from a first processing node, wherein the encrypted data corresponds to an application program of the first processing node;
   generating a secure storage key based on the second external keying material, wherein the second external keying material is the same as a first external keying material corresponding to the first processing node; and
   decrypting, using the secure storage key, the encrypted data corresponding to the application program.

10. The data management method of claim 9, wherein generating the secure storage key comprises generating the secure storage key based on the second external keying material and based on a second internal keying material corresponding to the second processing node or an application internal keying material corresponding to the application program, and wherein the second internal keying material is the same as a first internal keying material corresponding to the first processing node.

11. The data management method of claim 10, further comprising configuring a trusted operating system in the second processing node, wherein the application program comprises a trusted application, wherein the second internal keying material corresponds to the trusted operating system, and wherein the application internal keying material corresponds to the trusted application.

12. The data management method of claim 9, wherein the data corresponding to the application program comprises a client application of the application program and a trusted application of the application program.

13. A data management system, comprising:
   a first processing node configured to:
      receive, from a key management node, an external keying material corresponding to the first processing node and comprising a randomly generated number, wherein the external keying material corresponds to a cluster that the first processing node belongs, and wherein external keying materials allocated at the key management node to processing nodes in a same cluster are the same;
      generate a secure storage key based on the external keying material;

encrypt, using the secure storage key, data corresponding to an application program in the first processing node to obtain encrypted data; and send the encrypted data corresponding to an application program of the first processing node; and a second processing node configured to:

receive, from the key management node, the external keying material and based on the cluster, wherein the second processing node is allocated to the cluster;

receive the encrypted data from the first processing node;

generate a second secure storage key based on the external keying material, wherein the second secure storage key is the same as the secure storage key; and decrypt, using the second secure storage key, the encrypted data corresponding to the application program.

14. The data management system of claim 13, wherein the first processing node is configured to generate the secure storage key based on the first external keying material and based on a first internal keying material corresponding to the first processing node or an application internal keying material corresponding to the application program, and wherein a second internal keying material corresponding to the second processing node is the same as the first internal keying material.

15. The data management system of claim 14, wherein the first processing node is configured with a trusted operating system, wherein the application program comprises a trusted application, wherein the first internal keying material corresponds to the trusted operating system, and wherein the application internal keying material is an internal keying material corresponding to the trusted application.

16. The data management system of claim 15, wherein the first processing node is configured to:

run an operating system;

configure an execution environment;

configure a trusted execution environment (TEE) in the execution environment, wherein the trusted operating system and the trusted application are in the TEE.

17. The data management system of claim 13, wherein the data corresponding to the application program comprises a client application of the application program and a trusted application of the application program.

18. The data management system of claim 13, wherein the cluster meets at least one of the following conditions:

service scenarios of the processing nodes in the cluster are the same;

a quantity of processing nodes in the cluster is less than a preset quantity; or processing nodes in the cluster are located in a same network topology.

19. The data management system of claim 13, further comprising a storage node, wherein the first processing node is configured to send, to the second processing node via the storage node, data corresponding to an application program.

20. The data management system of claim 19, further comprising a management node, wherein the management node is configured to perform cluster division on processing nodes in the data management system in response to a cluster division instruction.

* * * * *

UNITED STATES PATENT AND TRADEMARK OFFICE
CERTIFICATE OF CORRECTION

| | | |
|---|---|---|
| PATENT NO. | : 12,487,944 B2 | Page 1 of 1 |
| APPLICATION NO. | : 18/298006 | |
| DATED | : December 2, 2025 | |
| INVENTOR(S) | : Binghua Zhang, Guohua Shen and Gang Liu | |

It is certified that error appears in the above-identified patent and that said Letters Patent is hereby corrected as shown below:

In the Claims

Claim 6, Column 44, Lines 1-2: "the encrypted first external" should read "the first external"

Signed and Sealed this
Sixth Day of January, 2026

John A. Squires
*Director of the United States Patent and Trademark Office*